(12) United States Patent
Vasilyev et al.

(10) Patent No.: US 8,340,484 B2
(45) Date of Patent: Dec. 25, 2012

(54) COMPACT MULTI-PORT OPTICAL SIGNAL PROCESSOR

(75) Inventors: Michael Vasilyev, Plano, TX (US); Nikolai M. Stelmakh, Arlington, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 274 days.

(21) Appl. No.: 12/652,149

(22) Filed: Jan. 5, 2010

(65) Prior Publication Data
US 2011/0164879 A1 Jul. 7, 2011

(51) Int. Cl.
*G02B 6/34* (2006.01)
*G02B 6/26* (2006.01)
*G02B 6/42* (2006.01)

(52) U.S. Cl. ............... 385/37; 385/1; 385/15; 385/31; 385/39; 385/46; 385/49; 385/50

(58) Field of Classification Search ................ 385/37, 385/46
See application file for complete search history.

(56) References Cited

U.S. PATENT DOCUMENTS

| | | | | |
|---|---|---|---|---|
| 6,122,419 A * | 9/2000 | Kurokawa et al. | ............... | 385/31 |
| 6,381,052 B1 * | 4/2002 | Delisle et al. | .................... | 398/87 |
| 6,580,850 B1 | 6/2003 | Kazarinov et al. | | |
| 6,594,409 B2 * | 7/2003 | Dutt et al. | ........................ | 385/14 |
| 6,775,437 B2 | 8/2004 | Kazarinov et al. | | |
| 6,882,782 B2 * | 4/2005 | Conzone et al. | ................ | 385/49 |
| 6,912,362 B1 * | 6/2005 | Takiguchi et al. | ............. | 398/158 |
| 6,952,512 B2 * | 10/2005 | Parker et al. | .................... | 385/39 |
| 7,013,065 B2 * | 3/2006 | Petermann et al. | ............. | 385/37 |
| 7,505,690 B2 | 3/2009 | Vasilyev et al. | | |
| 7,711,222 B2 * | 5/2010 | Blum et al. | ....................... | 385/37 |
| 2004/0062512 A1 * | 4/2004 | Pawlowski et al. | ........... | 385/141 |
| 2004/0101239 A1 * | 5/2004 | Parker | .............................. | 385/37 |
| 2008/0056643 A1 * | 3/2008 | Tsuda et al. | ..................... | 385/37 |

OTHER PUBLICATIONS

C. Doerr, "Planar Lightwave Devices for WDM," chapter 9 in Optical Fiber Telecommunications, vol. IVA (2002), pp. 405, 420-423, 470, 471.
B. Mukherjee, Optical Communication Networks, McGraw-Hill, Jul. 1997, pp. 62-67, New York.
R. Ramaswami et al., Optical Networks: A Practical Perspective, 3rd Edition, Morgan Kaufmann Publishers, 2010, pp. 112-115, San Francisco.

(Continued)

*Primary Examiner* — Ryan Lepisto
(74) *Attorney, Agent, or Firm* — Chowdhury & Georgakis, P.C.

(57) ABSTRACT

In a method and system to fabricate a compact optical device, a periodic group-delay device (PGDD) includes N optical input ports, N being a positive integer number, each port being configured to include one or more wavelength-division-multiplexing (WDM) channels; N corresponding optical output ports, each port being configured to include one or more WDM channels. The PGDD also includes a first slab waveguide region (FSWR) coupled to the N optical input ports, a second slab waveguide region (SSWR) coupled to the said N optical output ports, a first optical grating coupled to the FSWR, a second optical grating coupled to the SSWR, and; a third slab waveguide region (TSWR) coupled to at least one of the first and second optical gratings. The TSWR is configured to provide a configurable amount of dispersion to the N optical output ports. Optical signals carried by each WDM channel are processed concurrently and independently.

43 Claims, 13 Drawing Sheets

OTHER PUBLICATIONS

L. Lunardi et al., "Tunable Dispersion Compensation at 40-Gb/s Using a Multicavity Etalon All-Pass Filter With NRZ, RZ, and CS-RZ Modulation," J. Lightwave Technology, vol. 20, Iss. 12, Dec. 2002, pp. 2136-2144.

D. Yang et al., "Fiber Dispersion and Dispersion Slope Compensation in a 40-Channel 10-Gb/s 3200-km Transmission Experiment Using Cascaded Single-Cavity Gires—Tournois Etalons," IEEE Photonics Technology Letters, vol. 16, Iss. 1, Jan. 2004, pp. 299-301.

R. Lachance et al., "50 and 100GHz Multi-Channel Tunable Chromatic Dispersion Slope Compensator," Optical Fiber Communications Conference 2003, Technical Digest, vol. 1, 2003, pp. 164-165.

C. K. Madsen et al., "Integrated All-Pass Filters for Tunable Dispersion and Dispersion Slope Compensation," IEEE Photonics Technology Letters, vol. 11, Iss. 12, Dec. 1999, pp. 1623-1625.

C. Doerr et al., "Multichannel Integrated Tunable Dispersion Compensator Employing a Thermooptic Lens," Optical Fiber Communications Conference 2002, post-deadline paper FA6, pp. FA6-1-FA6-3.

N. Stelmakh, "Folded Design of AWG Multiplexer/Demutiplexer," OSA Annual Meeting 2003, paper WC4 (2 unnumbered pages).

N. Stelmakh et al., "Design of Athermal Folded AWG with an External Mirror," in Integrated Photonics Research and Applications Conference 2005, paper ITuF3 (3 unnumbered pages).

Y. Li et al., "Silicon Optical Bench Waveguide Technology," chapter 8 in Optical Fiber Telecommunications, vol. IIIb, 1997, pp. 319, 350-359, 370-376.

C. Doerr et al., "Arrayed Waveguide Dynamic Gain Equalization Filter with Reduced Insertion Loss and Increased Dynamic Range," IEEE Photonics Technology Letters, vol. 13, Iss. 4, Apr. 2001, pp. 329-331.

M. Zirngibl, "Applications for Optical Switch Fabrics," chapter 8 in Optical Fiber Telecommunications, vol. IVA, 2002, pp. 374, 375, 394-397.

G. P. Agrawal, "Optical Signal Processing," chapter 8 in Applications of Non-Linear Fiber Optics, 2nd Edition, Academic Press, 2008, pp. 349-396, San Diego.

A. G. Striegler et al., "NOLM-Based RZ-DPSK Signal Regeneration," IEEE Photonics Technology Letters, vol. 17, Iss. 3, Mar. 2005, pp. 639-641.

K. Cvecek et al., "2R-Regeneration of an 80-Gb/s RZ-DQPSK Signal by a Nonlinear Amplifying Loop Mirror," IEEE Photonics Technology Letters, vol. 19, Iss. 19, Oct. 2007, pp. 1475-1477.

K. Cvecek et al., "Phase-preserving Amplitude Regeneration for a WDM RZ-DPSK Signal Using a Nonlinear Amplifying Loop Mirror," Optics Express, vol. 16, Iss. 3, Feb. 2008, pp. 1923-1928.

J. Yu et al., "8×40 Gb/s 55-Km WDM Transmission Over Conventional Fiber Using a New RZ Optical Source," IEEE Photonics Technology Letters, vol. 12, Iss. 7, Jul. 2000, pp. 912-914.

B. Ibarra-Escamilla et al., "Experimental Investigation of the Nonlinear Optical Loop Mirror with Twisted Fiber and Birefringence Bias," Optics Express, vol. 13, Iss. 26, Dec. 2005, pp. 10760-10767.

N. S. Patel et al., "Interferometric All-optical Switches for Ultrafast Signal Processing," Applied Optics, vol. 37, Iss. 14, 1998, pp. 2831-2842.

P. Patki et al., "Recirculating-Loop Study of Dispersion-Managed 2R Regeneration," Conference on Lasers and Electro-Optics, 2007, paper CMZ3, available at http://www-ee.uta.edu/vasilyev/NSF/CLEO2007.pdf (2 unnumbered pages).

P. G. Patki et al., "Single-Channel 2R Regeneration in Quasi-Continuous Dispersion-Managed Nonlinear Medium," Frontiers in Optics / Laser Science XXIII Meeting, Sep. 2007, San Jose, CA, paper FThS3, available at http://www-ee.uta.edu/vasilyev/NSF/Fi02007.pdf (1 unnumbered page).

A. H. Gnauck et al., "25.6-Tb/s C+L-Band Transmission of Polarization-Multiplexed RZ-DQPSK Signals," Optical Fiber Communication conference, Mar. 2007, Anaheim, CA, paper PDP19 (pp. 1-3).

T. Ohara et al., "40-Gb/s × 4-Channel All-Optical Multichannel Limiter Utilizing Spectrally Filtered Optical Solitons," IEEE Photonics Technology Letters, vol. 15, Iss. 5, 2003, pp. 763-765.

CH. Kouloumentas et al., "All-Fiberized Dispersion-Managed Multichannel Regeneration at 43 Gb/s," IEEE Photonics Technology Letters, vol. 20, Iss. 22, 2008, pp. 1854-1856.

Website (http://www.ihq.uni-karlsruhe.de/research/projects/TRIUMPH/) of EU Project TRIUMPH, 2009 (pp. 1-4).

M. Vasilyev et al., "All-Optical Multi-Channel 2R Regeneration in a Fiber-Based Device," Optics Letters, vol. 30, Iss. 12, 2005, pp. 1458-1460.

M. Vasilyev et al., "Fiber-Based All-Optical 2R Regeneration of Multiple WDM Channels," Optical Fiber Communications Conference 2005, paper OME62 (3 unnumbered pages).

P. V. Mamyshev, "All-Optical Data Regeneration Based on Self-Phase Modulation Effect," in Proceeding of the European Conference on Optical Communications (ECOC, Madrid, Spain, 1998), vol. 1, pp. 475-476.

M. Vasilyev et al., "Multi-wavelength All-Optical Regeneration," Optical Fiber Communications Conference 2008, invited paper OWK3, Feb. 2008, San Diego, CA (3 unnumbered pages).

X. Wei et al., "Reduction of Collision-Induced Timing Jitter in Dense Wavelength-Division Multiplexing by the Use of Periodic-Group-Delay Dispersion Compensators," Optics Letters, vol. 28, Iss. 12, 2003, pp. 983-985.

P. Patki et al., "All-Optical Regeneration of Multi-Wavelength Signals," IEEE LEOS European Winter Topical on Nonlinear Processing in Optical Fibres, invited paper WC2.3, Jan. 2009, Innsbruck, Austria, available at http://www-ee.uta.edu/vasilyev/NSF/LEOS_NPOF2009.pdf (2 unnumbered pages).

T. Lakoba et al., "A New Robust Regime for a Dispersion-Managed Multichannel 2R Regenerator," Optics Express, vol. 15, Iss. 16, 2007, pp. 10061-10074.

M. Vasilyev et al., "Transparent Ultra-Long-Haul DWDM Networks with "Broadcast-and-Select" OADM/OXC Architecture," J. Lightwave Technology, vol. 21, Iss. 11, 2003, pp. 2661-2672.

L. F. Mollenauer et al., "Experimental Test of Dense Wavelength-Division Multiplexing Using Novel, Periodic-Group-Delay-Complemented Dispersion Compensation and Dispersion-Managed Solitons," Optics Letters, vol. 28, Iss. 21, 2003, pp. 2043-2045.

O. Tsunoda et al., "Design of Athermal Folded Arrayed Waveguide Grating with External Mirror," Strategic Partnership for Research in Nanotechnology Conference II, Nov. 2004, Richardson, TX, paper 33 (1 unnumbered page, abstract only, no other paper published).

M. Kolesnikov et al., "Spatially Singlemode Broad-Area Semiconductor Laser with Planar External Cavity," Electronics Letters, vol. 40, Iss. 13, 2004, pp. 807-808.

V. Stelmakh et al., "Multi-Channel Reflective Binary Phase Modulator Simultaneously Satisfying Phase Shift and Anti-Reflection Conditions," Frontiers in Optics, 2007, paper JSuA29 (1 unnumbered page).

N. Stelmakh et al., "Silicon Nitride Planar Tapered Transitions for Broad-Area Laser Diodes," Frontiers in Optics, 2007, paper JSuA28 (1 unnumbered page).

K. D. Le et al., "Electrooptically Tunable Folded Arrayed Waveguide Grating Multiplexer," IEEE Photonics Technology Letters, vol. 17, Iss. 1, 2005, pp. 112-114.

O. Tsunoda et al., "Electro-Optically Tunable Folded Arrayed Waveguide Grating Multiplexer," Strategic Partnership for Research in Nanotechnology Conference II, Nov. 2004, Richardson, TX, paper 34 (1 unnumbered page, abstract only, no other paper published).

N. Stelmakh et al., "Measurement of Spatial Modes of Broad-Area Diode Lasers with 1-GHz Resolution Grating Spectrometer," IEEE Photonics Technology Letters, vol. 18, Iss. 15, 2006, pp. 1618-1620.

N. Stelmakh et al., "Degenerate and Nondegenerate Lateral-Mode Patterns in Quantum Cascade Lasers," Applied Physics Letters, vol. 94, 2009, pp. 013501-1 to 013501-3.

N. Stelmakh, "Harnessing Multimode Broad-Area Laser-Diode Emission Into a Single-Lobe Diffraction-Limited Spot," IEEE Photonics Technology Letters, vol. 19, Iss. 18, 2007, pp. 1392-1394.

* cited by examiner

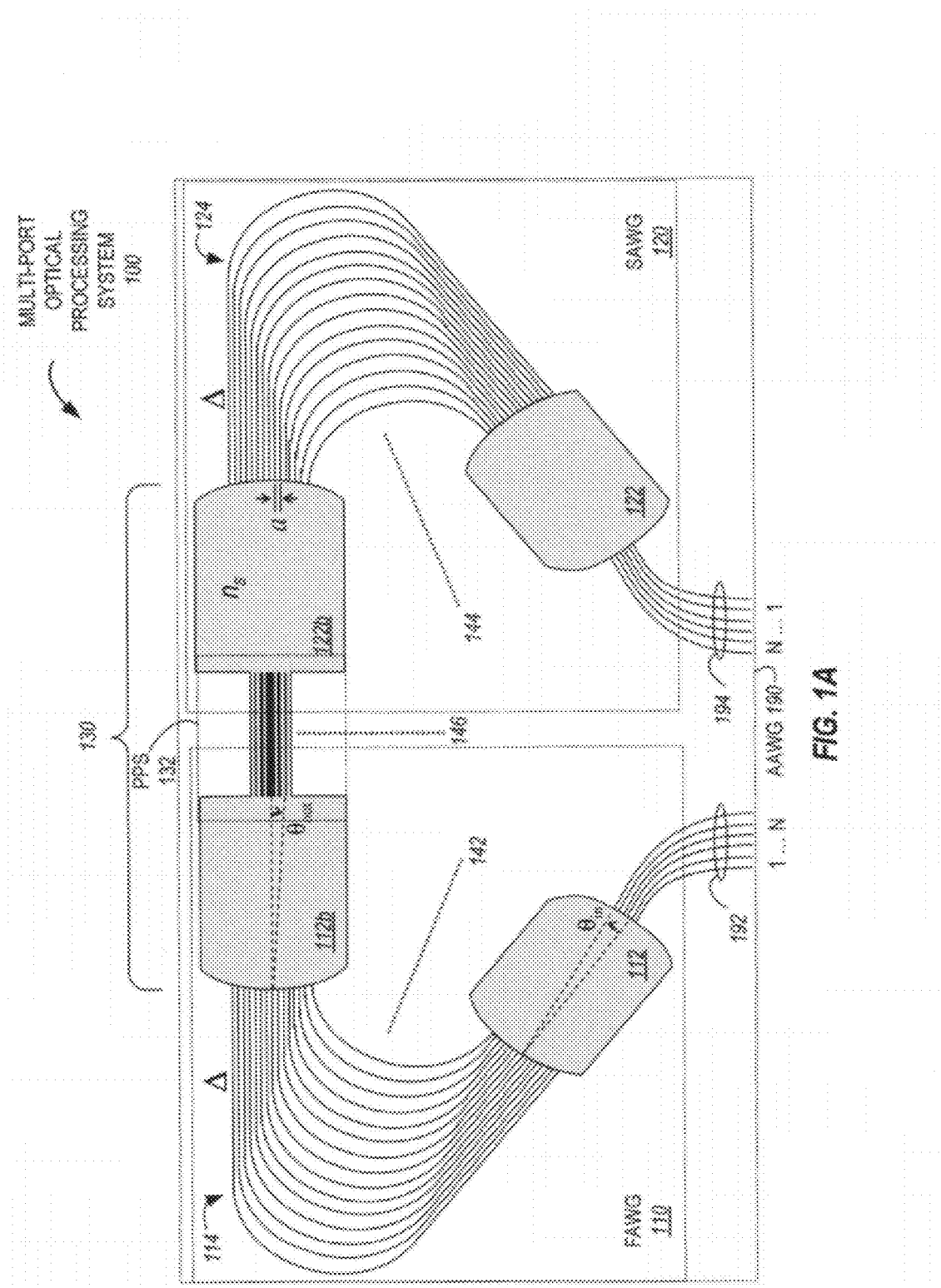

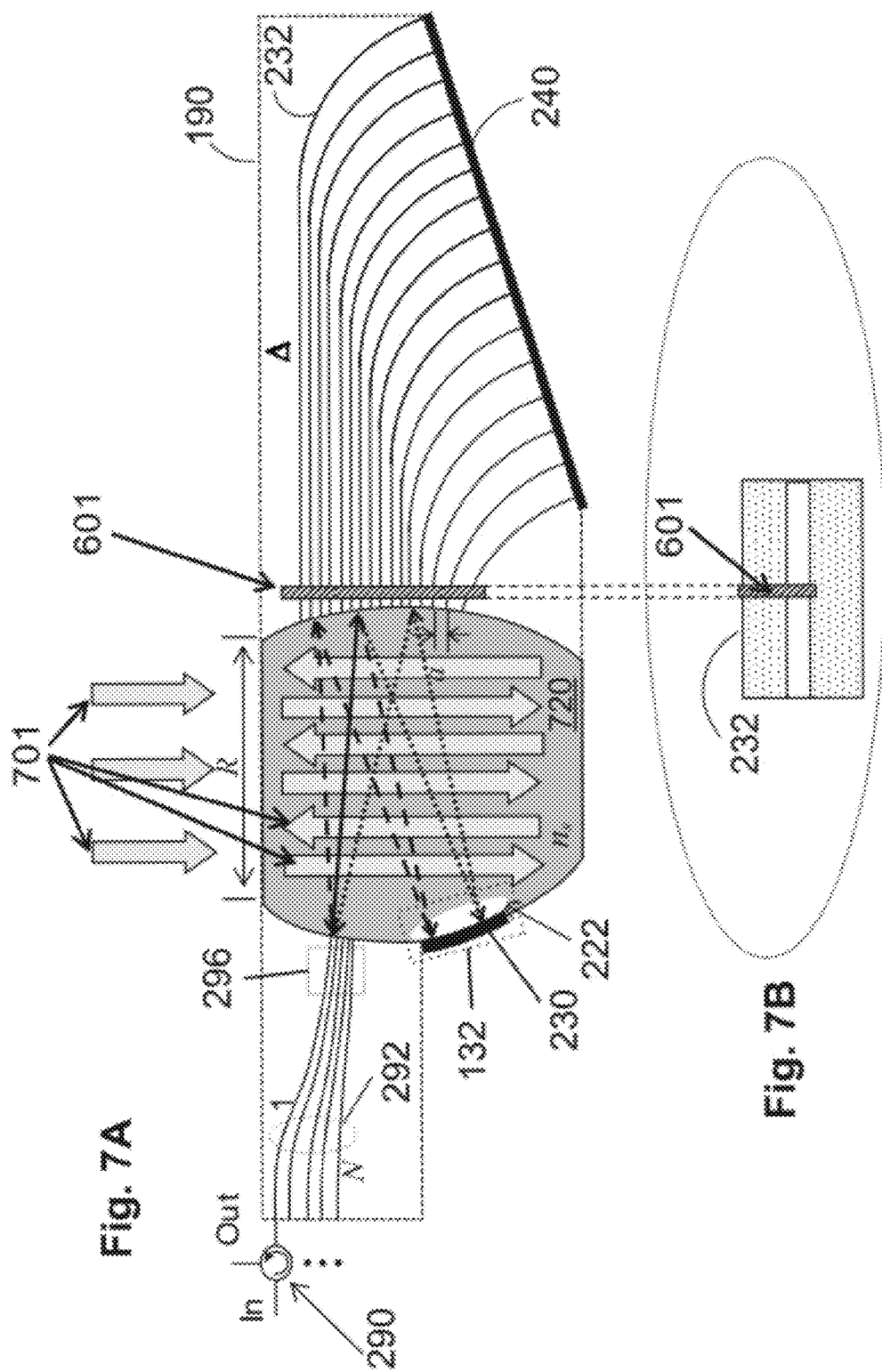

COMPACT MULTI-PORT OPTICAL SIGNAL PROCESSOR

The present disclosure relates generally to optical signal processing.

Currently, optical communication links are the preferred means of data transmission. Optical communication links have superior multi-terahertz bandwidth which allows transmission over distances varying from several meters to thousands of kilometers, e.g., transoceanic distances. The rapid accumulation of various propagation impairments (e.g., fading, scattering, diffraction of free-space optical connections, as well as amplified spontaneous emission, chromatic and polarization-mode dispersions, and crosstalk for fiber-optic links), however, requires frequent termination of optical communication links by optical detectors, so that the signals may be electronically regenerated and retransmitted. This so-called opto-electro-optical (OEO) regeneration is complex, bulky and extremely expensive. OEO regeneration for high-capacity optical links containing multiple wavelength-division-multiplexed (WDM) channels requires separate regenerators for each channel, and is thus especially complex and expensive.

Many regenerators are single-optical-channel devices implemented on a channel-by-channel basis and are therefore not practical for an all-optical network that requires simultaneous processing of multiple WDM channels without converting them to the electrical domain. More recently, U.S. Pat. No. 7,505,690, entitled 'Multi-channel all optical signal processor', to Vasilyev, et al., and incorporated herein by reference, describes a multi-channel all-optical regeneration system. However management of cost, size, complexity, signal loss, and power consumption issues associated with current multi-channel all-optical signal processing systems may be challenging.

SUMMARY

An all-optical signal processor that takes full advantage of optical parallelism may be used to implement processing functions for all WDM channels simultaneously. One technique may use multiple sections of highly nonlinear fiber (HNLF) separated by periodic group-delay devices (PGDDs) to create an artificial nonlinear-optical group-delay-managed medium (NOGDMM) with customized dispersion properties necessary for multi-channel operation. For each processor, about 10-20 PGDDs may be needed, making PGDD a very attenuation- and cost-critical component. The high coupling loss (about 2.5 dB), large size, and significant manual labor cost of many bulk-optics and fiber-Bragg-grating-based PGDDs (e.g., such as those marketed by suppliers such as JDS, Avanex, Teraxion and others) may make them economically unsuitable for many applications.

Potential implementation of the PGDDs using planar lightwave circuit (PLC) technology may be a good alternative to bulk-optics PGDDs. Even though the existing PLC approach of using several microring resonators may allow low-cost integration of multiple PGDDs on a small chip, it may result in high loss due to either short waveguide bending radius (e.g., in low-contrast PLCs) or severe mismatch between the waveguide and optical fiber modes (e.g., in high-contrast PLCs). In addition, the technology for potential solutions using high-contrast chalcogenide waveguides and photonic crystals may not be mature enough to produce low-cost and low-loss optical devices. Thus, low-loss, low-cost PGDD technology is highly desired for practical implementation of the multi-channel all-optical signal processor. If proven feasible, such a low-loss, low-cost PGDD can also find wide use as a dispersion compensator in conventional optical transmission systems.

The foregoing needs are addressed by the teachings of the present disclosure, which relates to a compact multi-port optical device. According to one embodiment, a method and system to fabricate an optical device, may include a periodic group-delay device (PGDD) having N optical input ports, N being a positive integer number, each port being configured to include one or more wavelength-division-multiplexing (WDM) channels; N corresponding optical output ports, each port being configured to include one or more WDM channels; first slab waveguide region coupled to the N optical input ports; second slab waveguide region coupled to the N optical output ports; first optical grating coupled to the first slab waveguide region; second optical grating coupled to the second slab waveguide region; third slab waveguide region coupled to at least one of the first and second optical gratings, wherein the said third slab waveguide region is configured to provide a desirable amount of dispersion to the N optical output ports, each including one or more WDM channels. The optical signal carried by one of the WDM channels of the N optical input ports is processed concurrently and independently of the other signals carried by another WDM channel or another of the N optical input ports.

The embodiments provide an improved multi-port optical device that is two orders of magnitude reduced in cost, size, and power consumption. The improved optical device is potentially compatible with mobile and solar-powered operation and is compatible with mass production in silicon foundry. The improved optical device has considerably lower loss compared to existing bulk- or integrated-optics solutions. Complexity is reduced by several orders of magnitude leading to dramatically increased reliability (that may be particularly important for military and undersea communications). The improved optical device may be configured to provide a variety of signal-processing functions beyond PGDD, e.g. fixed or tunable periodic amplitude and phase responses, optical amplification, and others. Bit-rate flexibility is improved since the same device may handle multiple bit rates. The improved optical device may be a potential enabler of all-optical burst- and packet-switched networking, which may dramatically simplify network management and reduce subsequent end-user costs.

BRIEF DESCRIPTION OF THE DRAWINGS

FIG. 1A illustrates an improved all-optical, multi-port optical processing system, according to some embodiments;

FIG. 7A illustrates the double-folded all-optical, multi-port optical processing system of FIG. 2A, but with the addition of a birefringent waveplate, Er doping of the slab region, and pumping of the Er doped slab region by broad area laser diode beams, according to some embodiments. FIG. 7B is a partial or fragmentary view showing a side view of a cross-section of the waveguide grating and birefringent waveplate of FIG. 7A, according to some embodiments.

DETAILED DESCRIPTION

Figure 1B:
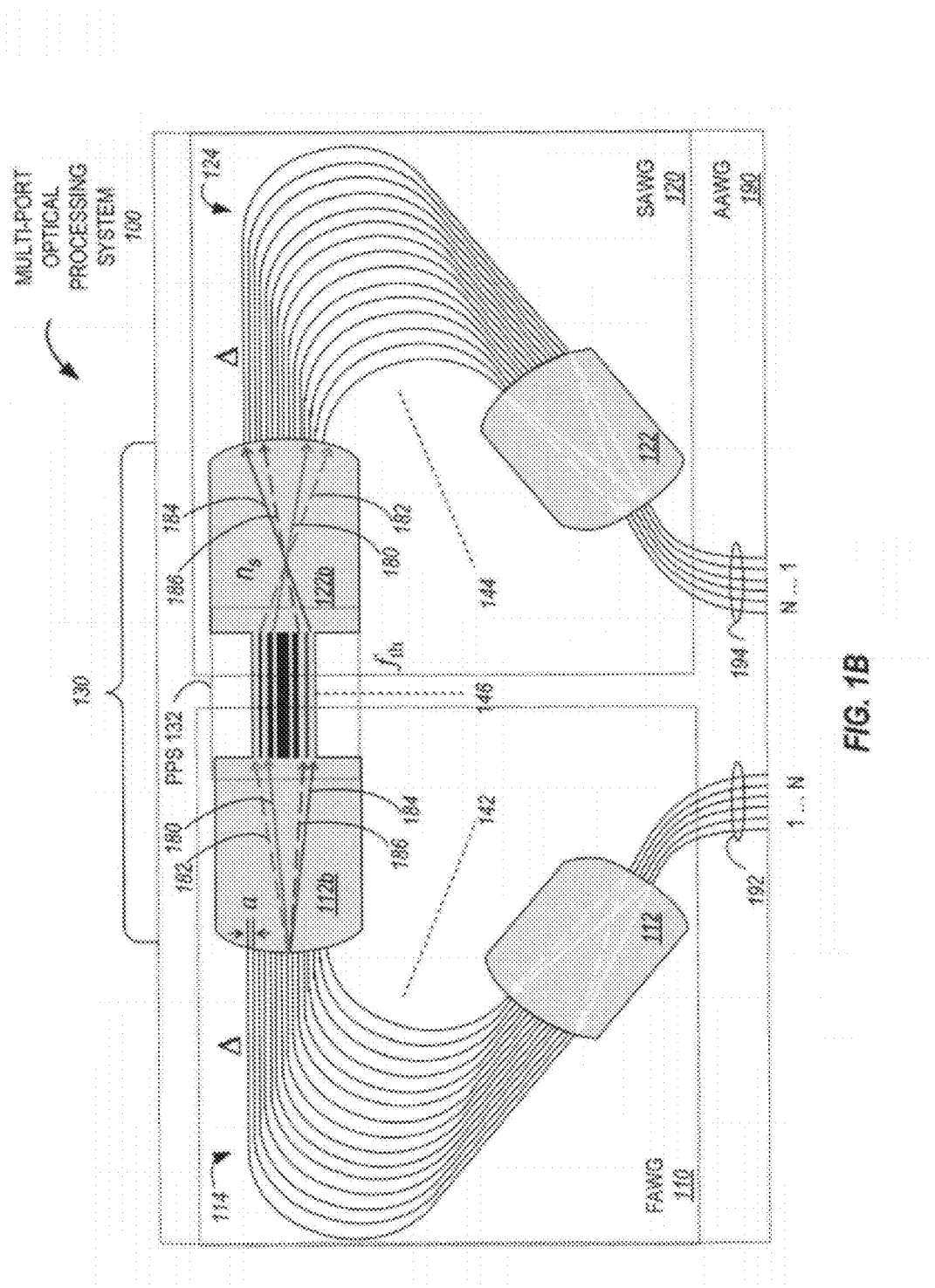
FIG. 1B illustrates potential paths traversed by optical beams within a multi-port optical processing system described with reference to FIG. 1A, according to some embodiments.

Novel features believed to be characteristic of the present disclosure are set forth in the appended claims. The disclosure itself, however, as well as a preferred mode of use, various objectives and advantages thereof, will best be understood by reference to the following detailed description of an illustrative embodiment when read in conjunction with the accompanying drawings. The functionality of various mechanical elements, members, or components for forming modules, sub-assemblies and assemblies assembled in accordance with a structure for an apparatus may be implemented using various materials and coupling techniques, depending on the application requirements. Descriptive and directional terms used in the written description such as top, bottom, left, right, and similar others, refer to the drawings themselves as laid out on the paper and not to physical limitations of the disclosure unless specifically noted. The accompanying drawings may not be drawn to scale and some features or shapes of embodiments shown and described herein may be simplified or exaggerated for illustrating the principles, features, and advantages of the disclosure.

Nonlinear-optical signal processing devices handle wavelength-division-multiplexed (WDM) channels individually (that is, require one device per every channel), thereby eliminating the optical processing parallelism, and offering marginal practical benefit compared to state-of-the-art electronic processing technology. Thus, utilization of the full advantage of superior optical bandwidth demands development of novel nonlinear-optical processing devices capable of handling many WDM channels simultaneously. This task, however, may be far from trivial or obvious, since the strong nonlinear-optical effects used for such processing are always accompanied by debilitating interaction among the WDM channels. More specifically, in nonlinear processing media [e.g., highly nonlinear fibers (HNLFs) and semiconductor optical amplifiers (SOAs)], the beneficial part of third-order nonlinearity (e.g., self-phase modulation, or SPM) is, for fundamental reasons, also accompanied by cross-phase modulation (XPM) and four-wave mixing (FWM) causing the strong inter-channel crosstalk. For example, in many all-optical regenerators, the presence of XPM may force the use of polarization interleaving or may require large channel spacing that may limit the number of co-polarized regenerated channels to just a few.

Therefore, a need exists to provide an improved all-optical multi-channel processing system that enables simultaneous (or concurrent or parallel) processing of multiple optical channels. For example, it would be desirable for the improved all-optical multi-channel optical processing system to suppress undesirable inter-channel nonlinearities (XPM and FWM) which are present in most nonlinear media while retaining the beneficial intrachannel (SPM) nonlinearity.

This problem may be addressed by deploying an improved artificial nonlinear medium that is configurable to provide tailored or customized nonlinear and dispersion properties favoring SPM and reducing XPM and FWM [a medium having this desirable property may be referred to as a nonlinear-optical group-delay-managed medium (NOGDMM)]. One implementation of such a medium comprises multiple sections of nonlinear optical material, separated by PGDDs.

Present approaches of providing multi-channel all-optical regeneration system that enables simultaneous regeneration of multiple optical WDM channels are still costly, complex, prone to signal loss, and have higher power consumption. This is due to the use of bulk-optic PGDD devices that are big, expensive, lossy, and difficult to fabricate in integrated form.

An enhanced NOGDMM-based system may include an improved optical device that implements the functionality of a large number N of PGDDs on a single chip with corresponding number of N inputs and N outputs, leading to reduced fabrication cost. Since each PGDD introduces phase response into K WDM channels, the entire chip may be viewed as a PGDD for K wavelength-division-multiplexed×N space-division-multiplexed (SDM) optical channels. Very low loss in this device may be achieved by utilizing low-loss arrayed waveguide grating (AWG) technology. The improved optical devices may deploy a single-folded or a double-folded AWG architecture to reduce the chip size (further reducing the fabrication costs) and enable adding a wide range of signal-processing functionality beyond basic PGDD capability.

According to one embodiment, a method and system to fabricate an optical device, may include a periodic group-delay device (PGDD) having N optical input ports, N being a positive integer number, each port being configured to include one or more wavelength-division-multiplexing (WDM) channels; N corresponding optical output ports, each port being configured to include one or more WDM channels; first slab waveguide region coupled to the N optical input ports; second slab waveguide region coupled to the N optical output ports; first optical grating coupled to the first slab waveguide region; second optical grating coupled to the second slab waveguide region; third slab waveguide region coupled to at least one of the first and second optical gratings, wherein the said third slab waveguide region is configured to provide a configurable amount of dispersion to the N optical output ports, each including one or more WDM channels. The optical signal carried by one of the WDM channels of the N optical input ports is processed concurrently and independently of the other signals carried by another WDM channel or another of the N optical input ports.

The following terminology may be useful in understanding the present disclosure. It is to be understood that the terminology described herein is for the purpose of description and should not be regarded as limiting.

Arrayed Waveguide Grating (AWG) device—An optical device based on a grating (or array) of waveguides that have equal length difference between adjacent members of the grating of waveguides. An AWG device, which typically includes input port(s), an input star coupler (or input slab waveguide region), grating of waveguides, an output star coupler (or output slab waveguide region), and output port(s), is operable to combine or separate optical signals having different wavelengths. Each wavelength of light coupled to the grating of waveguides (or optical grating), undergoes a constant change of phase attributed to the constant length increment in the grating of waveguides. Light diffracted from various grating waveguides interferes constructively and gets refocused at a particular output port, the output port being wavelength dependent because of the array phase shift due to the constant length increment.

Waveguide and Slab Area—A waveguide typically confines light in two dimensions. A slab area (also referred to as a slab waveguide region or a free-space region) is a star coupler that typically confines light in one dimension (e.g., vertical dimension). Many waveguides and slab areas may be fabricated by using glass or silicon materials, making the manufacturing compatible with silicon foundry.

Configuration—Describes a set up of an element, a device, a processor, a communications link, and others, and refers to a process for setting, defining, or selecting particular properties, parameters, or attributes of the element prior to its use or during its operation. Some configuration attributes may be selected to have a default value. For example, number of channels of an optical communications link may be configured to be equal to 128.

System—Interdependent devices or components that co-operate to perform one or more desired functions.

Embodiments of improved optical signal processing systems and methods are described with reference to FIGS. 1A-1D, 2A-2D, 3A-3B, 4A-4C, and 5.

FIG. 1A illustrates an improved all-optical, multi-port optical processing system 100, according to some embodiments. The system 100 includes an adapted arrayed waveguide grating (AAWG) device 190. The system 100 may be configured as a multi-port PGDD to facilitate the integration of a large number of PGDDs on a PLC chip. In the depicted embodiment, the AAWG 190 configuration includes a first arrayed waveguide grating (FAWG) device 110 and a second arrayed waveguide grating (SAWG) device 120 that are coupled to one another by a free space region 130 disposed therebetween. It is understood that the configuration of the AAWG 190 may be modified in dependence of the optical processing application requirements, e.g., size, power, signal characteristics, distance, noise, and others.

The FAWG 110 includes a first pair of slab waveguide regions 112 and 112b and a first optical grating of waveguides 114 disposed symmetrically around a first axis 142. A first one of the first pair of slab waveguide regions (112) is coupled to receive N optical input ports 192, N being a positive integer number. Each port of the N optical input ports 192 is configured to include one or more channels. Each channel is configured to receive all-optical signals in the form of optical beams having varying amplitude and phase characteristics.

The SAWG 120, similarly, includes a second pair of slab waveguide regions 122 and 122b and a second optical grating of waveguides 124 disposed symmetrically around a second axis 144. A second one of the second pair of slab waveguide regions (122) is coupled to provide N optical output ports 194 corresponding to the N optical input ports 192. Each port of the N optical output ports 194 is configured to include one or more channels. In some embodiments, the FAWG 110 and the SAWG 120 are configured to be identical devices that are disposed symmetrically around a third axis 146. The one or more channels may be configured as WDM channels.

In some embodiments, the free space region 130 (or the third slab waveguide region 130) may be formed by connecting a second one of the first pair of slabs 112b to a first one of the second pair of slabs 122b. The two N-port AWGs, e.g., FAWG 110 and SAWG 120, may be coupled so that a Mth input of the FAWG 110 is coupled to the Mth output of the SAWG 120. All signals received at the N optical input ports 192 independently propagate through the same free space region, experience similar PGDD group delays and, hence, represent N identical PGDDs on one chip working in parallel. Thus, the system 100 is configurable as a multi-port PGDD device. The multi-port PGDD functionality provided by the system 100 may be combined with nonlinear-optical material (e.g., in fiber or waveguide form) to fabricate an artificial nonlinear-optical group-delay-managed medium (NOGDMM) having customized dispersion properties that may be desired for multi-channel/multi-port operation. Additional details of the NOGDMM medium are described with reference to FIGS. 3A, 3B, 4A, 4B, 4C, and 5.

In some embodiments, the WDM spectra from different input ports almost entirely overlap in the slab waveguide region at the entrance of the SAWG 120. The area where the spectra may 'almost entirely overlap' may be disposed in the middle of the slab between the FAWG 110 and the SAWG 120. This area may also be referred to as a 'focal plane of the lens' formed by the curved surface of the interface between the slab 112b and the FAWG 110. Different frequency components within each WDM channel pass through different spatial points in the focal plane. In some embodiments, an optional parabolic phase shifter (PPS) 132 can be included in the focal plane of the slab waveguide region 130 for adjusting dispersion characteristics of the signals carried by the N optical input ports 192, thereby generating dispersed signals provided to the corresponding N optical output ports 194. The PPS 132 may be implemented as a thermal lens area selected within the slab waveguide region 130 by placing electrodes of a particular shape to create a temperature gradient leading to refractive index change, thereby causing a parabolic phase shift versus frequency within each WDM channel (this may be equivalent to placing a lens into free space). The parabolic phase shift may also be imposed by the PPS 132 by deploying one or more of the following (in addition to or instead of the thermal lensing): electro-optic effect, mirror curvature, doping of the slab area to change its refractive index, or a combination thereof. Additional details of a spectral response (both amplitude and phase) of the system 100 are described with reference to FIG. 4C.

Referring back to FIG. 1A, the directions of the input and output optical beams of the system 100 may be computed by using Equation 100:

$$n_g(\lambda)\Delta + n_s(\lambda)a(\theta_{in}+\theta_{out})=m\lambda \qquad \text{Eqn. 100}$$

where $n_g$ is the group refractive index of the grating area of an AWG, $n_s$ is the phase refractive index in a slab area of the AWG, $\Delta$ is the length increment of the AWG, a is the distance between centers of AWG waveguides at the slab-grating boundary, m is the AWG order, $\lambda$ is the wavelength, $\theta_{in}$ is the angular position of input waveguide port, and $\theta_{out}$ is the angular position of the beam focus in the AWG's output slab. Free spectral range of the AWG may be computed by using Equation 200:

$$\Delta v_{FSR}=c/(n_g\Delta) \qquad \text{Eqn. 200}$$

where c is the speed of light in vacuum. Under the condition $\Delta v_{FSR}=\Delta v_{channel}$, where $\Delta v_{channel}$ is the channel spacing of the incoming WDM signals, the spectra of all WDM channels completely spatially overlap in the focal plane of the output slab. By using the PPS 132 a parabolic index profile (and hence a parabolic phase change) may be imposed across each channel's spectrum. The parabolic phase spectrum results in linear group-delay spectrum, or constant dispersion across the channel's spectrum. Since the spectra of the WDM channels coming from the same input port spatially overlap in the focal plane, the phase and group-delay spectra are periodic with period $\Delta v_{FSR}$ (which can be also described as $\Delta v_{FSR}$ periodicity of the AWG response). Sending the optical signal through the SAWG 120 multiplexes the spectrum back into one output waveguide port.

The system 100 re-uses the same optical elements (slabs, waveguides, gratings, and others) for many multi-channel signals, each coming from its own input port and each carrying multiple WDM channels. The system 100 processes the signals from different ports independently of and concurrently with each other and routes them through different output ports. Thus, the system 100 effectively re-uses the same PGDD-equivalent pair of AWGs (e.g., FAWG 110 and SAWG 120) for multiple input waveguide ports, effectively integrating multiple PGDDs on the same chip. In order to accomplish the re-use feature of the optical elements, the angular separation of the input waveguides may be configured to satisfy one of two possible conditions:

Condition A: $Na_{in}/f \ll \lambda/(an_s)$, which means that the shift between the WDM spectra from different inputs is small compared to inter-channel spacing (here, N is the number of input waveguides, $a_{in}$ is the distance between the centers of input waveguides at the slab grating boundary, and f is the focal distance of the input slab waveguide); or Condition B: $a_{in}/f=\lambda/(an_s)$, which means that the shift between the WDM spectra from adjacent inputs exactly equals the inter-channel spacing. Condition B has been derived from Eqn. 100 by requiring the $m^{th}$ AWG diffraction order from one input to overlap with the $(m+1)^{th}$ AWG diffraction order from an adjacent input, i.e., they have the same $\theta_{out}(\lambda)$.

If one of the conditions A or B is satisfied, an Mth input of the N optical input ports 192 is coupled to an Mth output of the N optical output ports 194, with input-output transfer function having PGDD response, M being an positive integer number not greater than N. In some embodiments, if, instead of satisfying conditions A or B described above, an intermediate case is selected (e.g., $Na_{in}/f<\lambda/(an_s)$), such that the WDM spectra of adjacent input ports are slightly shifted from each other, then sliding-frequency PGDD filters may be implemented with or without amplitude filtering, which may be beneficial to multi-channel 2R regenerators based on both Mamyshev and soliton-filtering principles.

The system 100, in addition to having the AAWG 190 with multiple input and output ports, includes a focal plane such that the different frequency components within each WDM channel pass through different spatial points in that plane. As described earlier, this plane may be disposed in the middle of the slab between the FAWG 110 and the SAWG 120. In the focal plane, spectra of different WDM channels/input ports substantially overlap and the free spectral range of the AWG equals the WDM channel spacing.

FIG. 1B illustrates potential paths traversed by optical beams within a multi-port optical processing system 100 described with reference to FIG. 1A, according to some embodiments. As described earlier, the first one of the first pair of slab waveguide regions (112) is coupled to receive N optical input ports 192. The propagation of light rays from port #1 is illustrated by solid lines and from port #N by dashed lines. In the free space region 130 between the FAWG 110 and the SAWG 120, BS 180, BD 182 and RS 184, RD 186 lines (BS, BD, RS and RD used for identification purposes) show the short- and long-wavelength rays respectively within the bandwidth of one WDM channel. Without the PPS 132, the rays keep the same direction of propagation as that in the first slab waveguide region 112b between the AWGs, yielding normal (negative D) dispersion of the PGDDs. With the PPS 132 (e.g., implemented as a thermal lens), the rays undergo refraction and change the direction (shown in the second slab area between the two AWGs), which changes the dispersion and may potentially result in anomal (positive D) dispersion of the PGDDs. A value of the dispersion D may be computed by using Equation 300 shown below.

$$D=-(2/c)*(NUM/DEN)*(1-R/(2f_{th})) \qquad \text{Eqn. 300}$$

where $NUM=(n_g\Delta)^2 R$, $DEN=\lambda_o a^2 n_s$, and R is the radius of curvature of the circular borders of the slab waveguide areas 112b and 122b. The configurations equivalent to this, but folded once or twice, are described with reference to FIGS. 2A-2B.

Figure 1C:
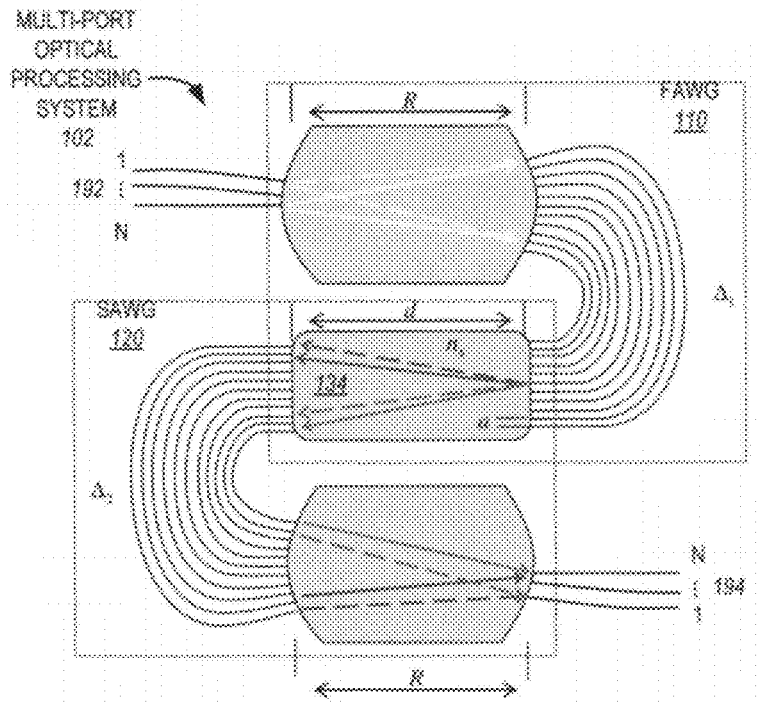
FIG. 1C illustrates a multi-port optical processing system configured to provide an inverted sequence of waveguides, according to some embodiments.

FIG. 1C illustrates a multi-port optical processing system 102 configured to provide an inverted sequence of waveguides in the second optical grating, according to some embodiments. In the depicted embodiment, the FAWG 110 and SAWG 120 are coupled in an arrangement that resembles a reverse-S shape to form the AAWG 190. It is understood that the arrangement may be coupled to resemble other shapes such as S shape. The free space region 130 between the FAWG 110 and the SAWG 120 includes a slab waveguide region 134. The geometry of the slab waveguide region 134 is such that the border of the slab waveguide region 134 and the FAWG 110 is not curved but rather substantially flat. This means that the focal plane of the slab waveguide region 134 is at infinity, i.e. outside of the slab waveguide region 134. The order of the N optical input ports 192 received is port #N through port #1 and the order of the N optical output ports 194 is port #1 through port #N. The inverted sequence of grating waveguides in the SAWG 120 may be considered to be equivalent to change of sign of the length increment $\Delta$ in the SAWG 120. A value of the dispersion D may be computed by using Equation 400 shown below.

$$D=\Delta_1\Delta_2 n_g^2 d/(c\lambda_o a^2 n_s) \qquad \text{Eqn. 400,}$$

where $\Delta_1$ and $\Delta_2$ are the length increments in the first and second optical gratings, respectively, and d is the length of the slab waveguide region 134. The absence of curved borders of the slab area 134 enables a change in the sign of the dispersion.

Figure 1D:
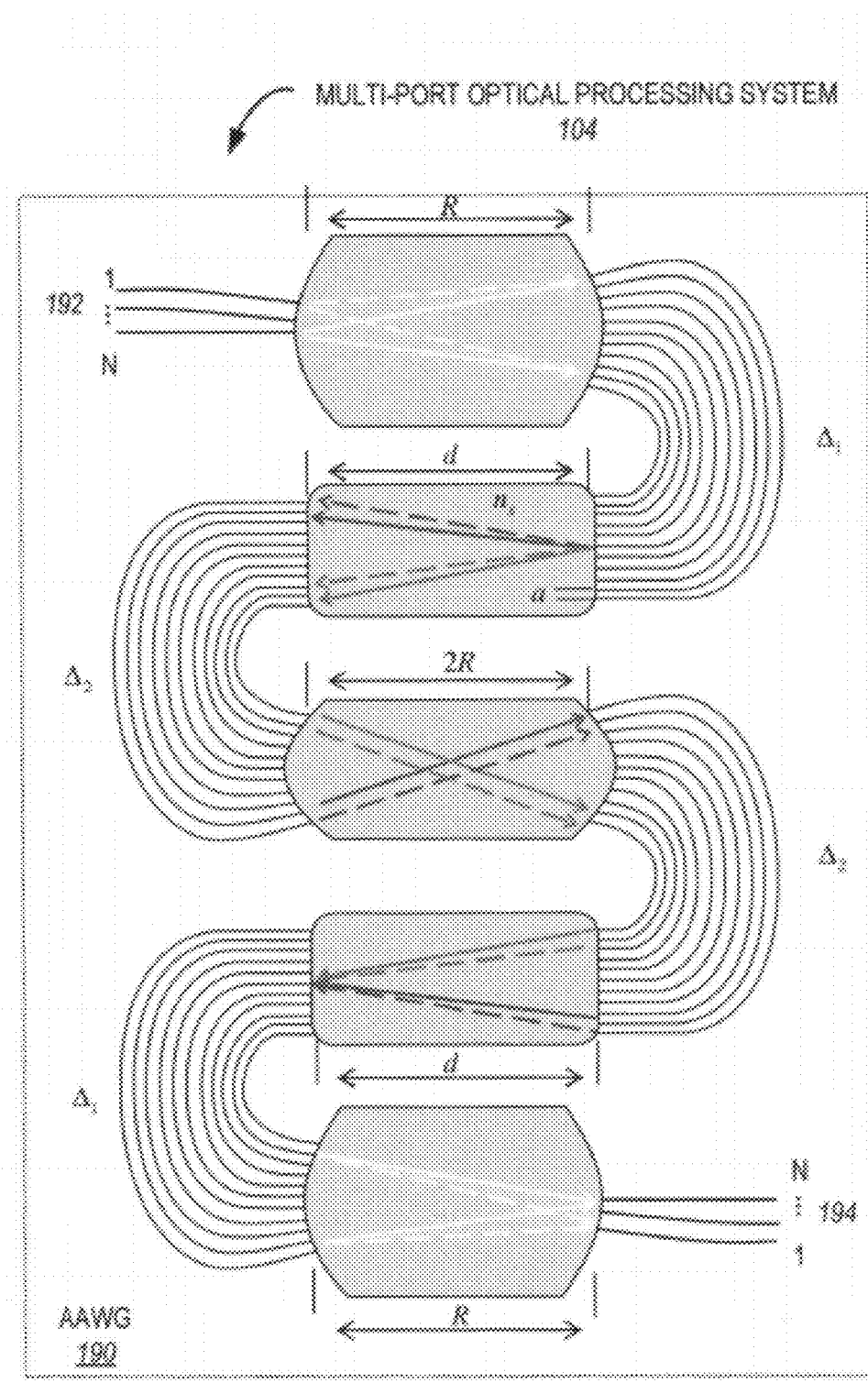
FIG. 1D illustrates a multi-port optical processing system configured to provide improved amplitude response and an inverted sequence of waveguides, according to some embodiments.

FIG. 1D illustrates a multi-port optical processing system 104 configured to provide an inverted sequence of waveguides with improved dispersion and amplitude response characteristics of the PGDD, according to some embodiments. The system 104 is similar to the system 100 and 102 described with reference to FIGS. 1A, 1B, 1C except for the number of AWG's. In the depicted embodiment, the AAWG 190 is configured to include 4 AWG's having 5 slab areas, the 4 AWG's being coupled in an arrangement that resembles two cascaded reverse-S shapes. The order of the N optical input ports 192 received is port #N through port #1 and the order of the N optical output ports 194 is port #1 through port #N. The system 104 in comparison with the system 102 described with reference to FIG. 1C provides twice the dispersion and improved amplitude characteristics of the PGDD. In system 100 and 102 described with reference to FIGS. 1A, 1B, and 1C, the short and long wavelengths go into the output waveguide ports at different angles, which leads to introduction of band-pass amplitude response in each WDM channel owing to the finite acceptance angle of the waveguides. The system 104, on the other hand, ensures that all wavelengths fall onto the output waveguide port at the same angle, which produces a flatter amplitude response. Thus, the cascaded reverse-S shaped arrangement of the AWGs may be used to control the amplitude response of the dispersed signals. The system 104 yields anomal (positive D) dispersion of the PGDDs. A value of the dispersion D for the system 104 is 2× the value of D for the system 102 described with reference to FIG. 1C and computed by using Equation 400 shown above.

Figure 2A:
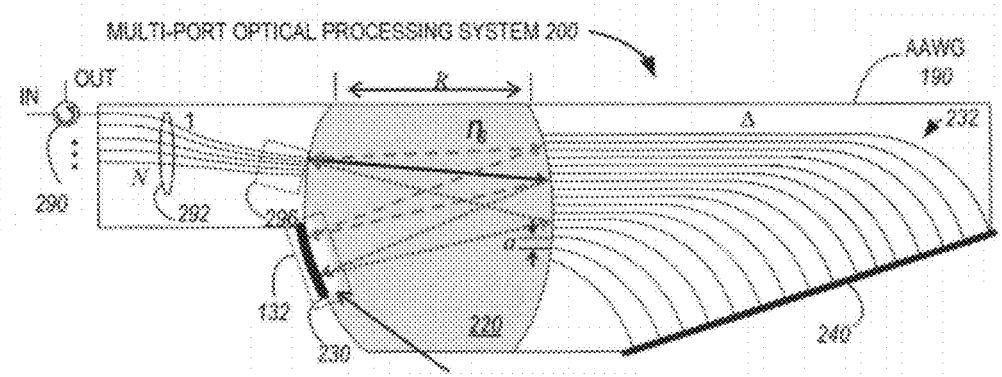
FIG. 2A illustrates a double-folded all-optical, multi-port optical processing system, according to some embodiments.

FIG. 2A illustrates a double-folded all-optical, multi-port optical processing system 200, according to some embodiments. The system 200, which enables the integration of a large number of PGDDs on a PLC chip, includes the AAWG 190 device that is configured to include a singular slab area 220. The singular slab area 220 may be formed by a double-folding technique described with reference to FIG. 5. The singular slab area 220 is coupled to receive N optical input/output ports 292 via bi-directional waveguides 296. An optical circulator 290 is included at each port to separate the input and output signals. Thus, while being operationally similar to the system 100 described with reference to FIG. 1A, the system 200 may be more compact (e.g., 4× reduction in slab and grating region sizes) and can be fabricated as a multi-port PGDD device on a small PLC chip. The optical circulator 290 may increase the footprint of the system 200. The multi-port PGDD functionality provided by the system 200 may be combined with nonlinear-optical material (e.g., in fiber or waveguide form) to fabricate an artificial nonlinear-optical group-delay-managed medium (NOGDMM) having customized dispersion properties that may be desired for multi-channel/multi-port operation. Additional details of the NOGDMM medium are described with reference to FIGS. 4A and 4B.

Referring back to FIG. 2A, the AAWG 190 is configured to include a grating of waveguides 232 and a first mirror 240, both being disposed external to the singular slab area 220. The mirror 240 is configured to receive optical signals from the singular slab area 220 via the grating of waveguides 232 and reflect the signals back to the singular slab area 220 via the grating of waveguides 232. The singular slab area 220 may include an optional parabolic phase shifter (PPS) 132 in its focal plane. As described earlier, the PPS 132 may be configured to generate a spectral plane by adjusting dispersion characteristics of the signals carried by the N optical input/output ports 292, thereby generating dispersed signals provided as output. Different frequency components within each WDM channel pass through different spatial points in the focal plane. The parabolic phase shift may be imposed by the PPS 132 by deploying one or more of the following technologies: thermal lensing, electro-optic effect, mirror curvature, doping of the slab area to change its refractive index, or a combination thereof.

In some embodiments, the PPS 132 may be implemented as a thermal lens area 222 formed next to a mirror 230 (i.e. second mirror) that may be disposed along a periphery of the singular slab area 220. The thermal lens area 222 may be formed by placing electrodes over a portion of the singular slab area 220. The mirror 230 may be configured to have a curved surface. It may also include spatially varying reflectivity (e.g. to impose amplitude filtering profile onto each WDM channel). A value of the dispersion D for the system 200 is computed by using Equation 500 shown below.

$$D = -8\Delta^2 n_g^2 R/(c\lambda_o a^2 n_s) x (1 - R/f_{th})$$  Eqn. 500

In the absence of the PPS 132 (flat mirror 230), the dispersion is normal (negative D).

Figure 2B:
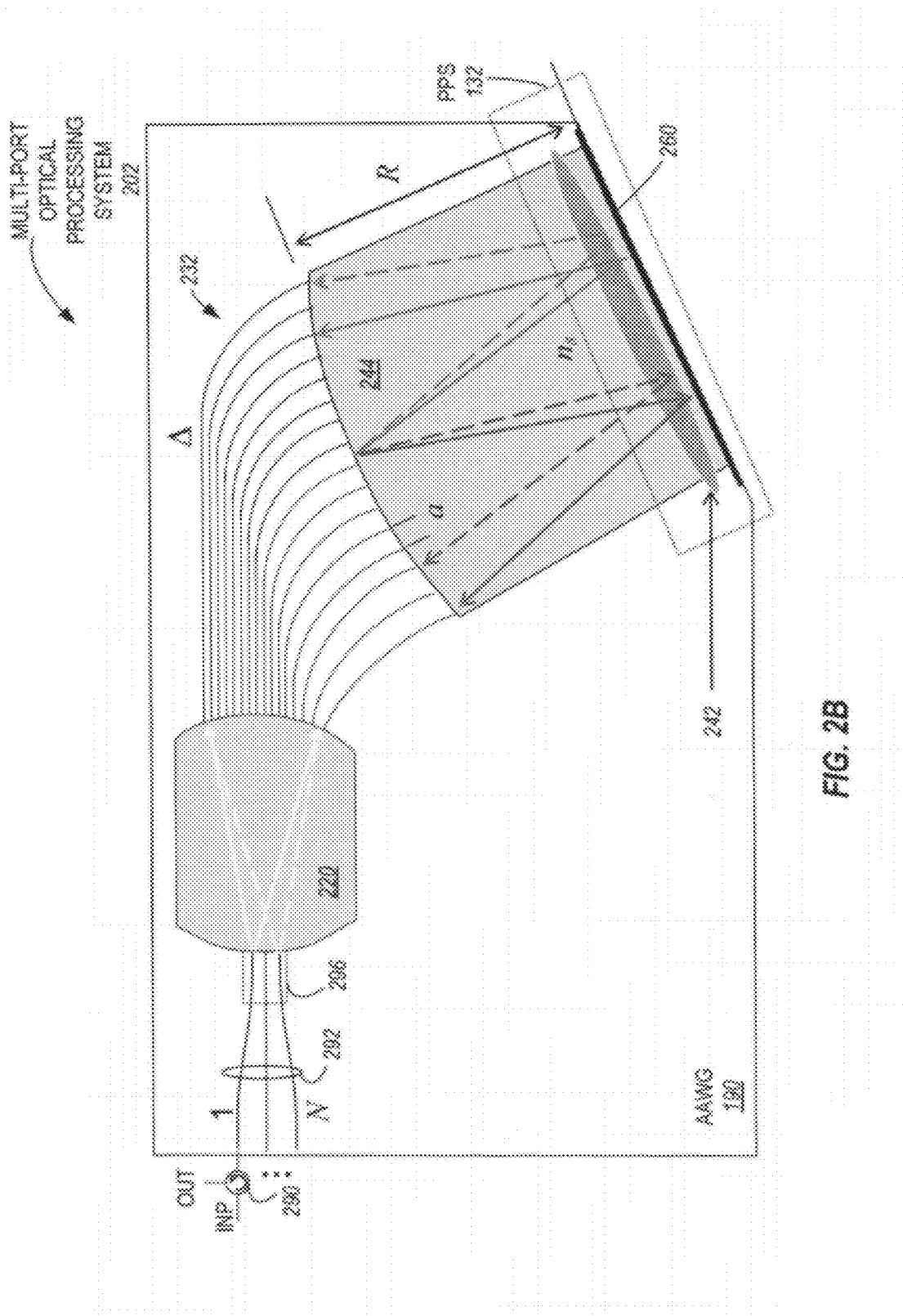
FIG. 2B illustrates a single-folded all-optical, multi-port optical processing system with thermal lensing, according to some embodiments.

FIG. 2B illustrates a single-folded all-optical, multi-port optical processing system 202 with optional thermal lens, according to some embodiments. The system 202, which enables the integration of a large number of PGDDs on a PLC chip, includes the AAWG 190 device that is configured to include two slab waveguide regions 220 and 244. The two slab waveguide regions 220 and 244 may be formed by deploying a single-folding technique described with reference to FIG. 5. The operations of system 202 and system 200 are similar. The slab waveguide region 220 is coupled to receive N optical input/output ports 292 via bi-directional waveguides 296. The optical circulator 290 in included at each port to separate the input and output signals. Thus, while being operationally similar to the system 100 described with reference to FIGS. 1A, 1B, the system 202 may be more compact (e.g., 2× reduction in slab and grating region sizes) and can be fabricated as a multi-port PGDD device on a small PLC chip. The optical circulator 290 may increase the footprint of the system 202. The multi-port PGDD functionality provided by the system 202 may be combined with nonlinear-optical material (e.g., in fiber or waveguide form) to fabricate an artificial nonlinear-optical group-delay-managed medium (NOGDMM) having customized dispersion properties that may be desired for multi-channel/multi-port operation. Additional details of the NOGDMM medium are described with reference to FIGS. 4A and 4B.

Referring back to FIG. 2B, the AAWG 190 is configured to include a grating of waveguides 232 disposed between the first slab area 220 and the second slab waveguide region 244. The second slab waveguide region 244 is configured to have a circularly curved border coupled to the waveguides 232. The PPS 132 may be implemented using an optional thermal lens 242 formed within the slab waveguide region 244, and a mirror 260 is disposed along the periphery of the slab waveguide region 244. The mirror 260 is configured to receive optical signals from the slab waveguide region 244 and reflect the signals back to the slab waveguide region 244 along a different path.

The mirror 260 in the system 202 is disposed in the focal plane of the slab waveguide region 244. The optional parabolic phase shifter (PPS) 132 implemented by using the thermal lens 242, may be configured to adjust dispersion characteristics of the signals carried by the N optical input/output ports 292, thereby generating dispersed signals provided as output. Different frequency components within each WDM channel pass through different spatial points in the focal plane. A value of the dispersion D for the system 202 is computed by using Equation 600 shown below.

$$D = -2\Delta^2 n_g^2 R/(c\lambda_o a^2 n_s)\times(1-R/f_{th})$$ Eqn. 600

Figure 2C:
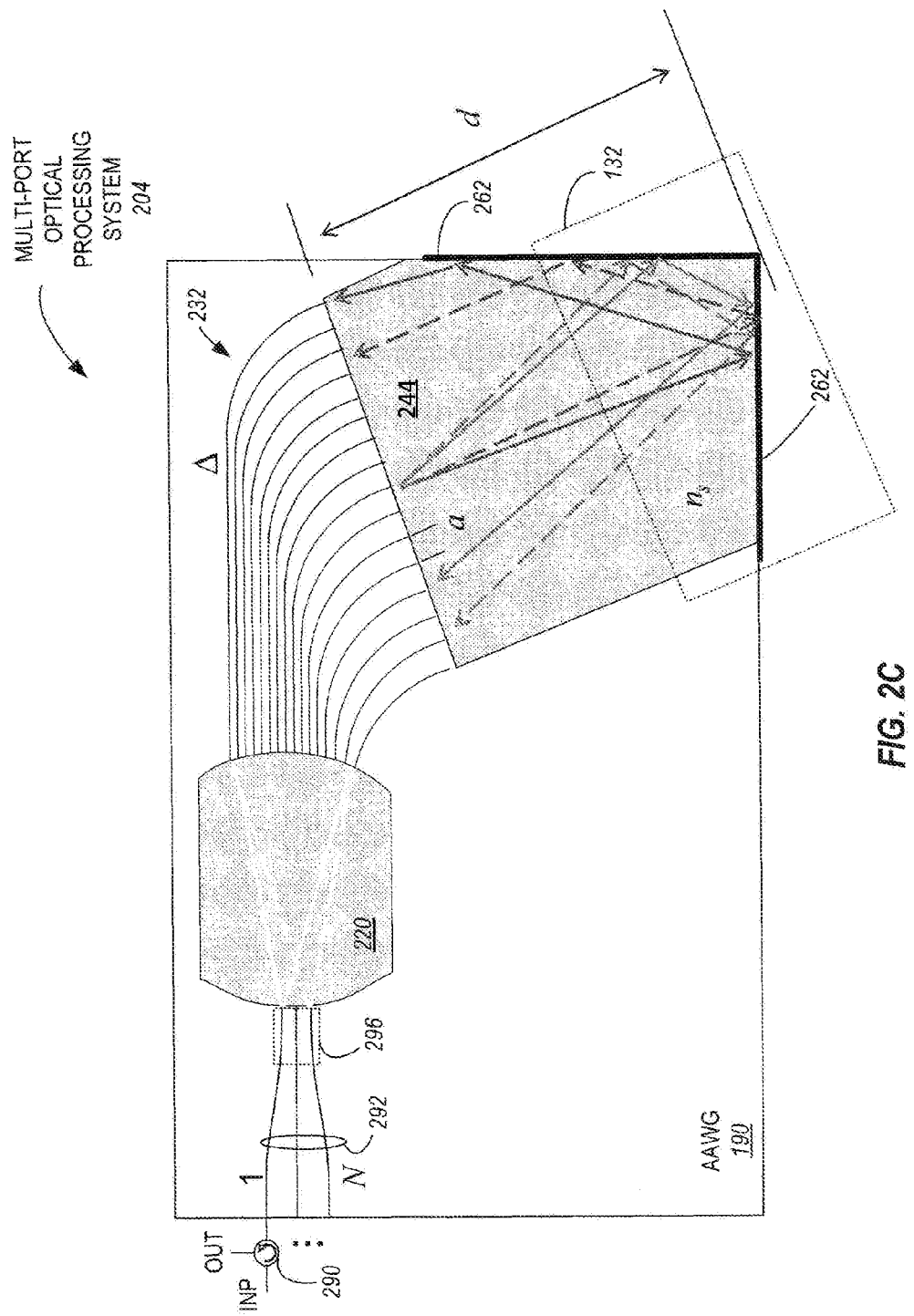
FIG. 2C illustrates a single-folded all-optical, multi-port optical processing system using double mirror, according to some embodiments.

FIG. 2C illustrates a single-folded all-optical, multi-port optical processing system 204 using double mirror, according to some embodiments. The system 204, which enables the integration of a large number of PGDDs on a PLC chip, includes the AAWG 190 device that is configured to include two slab waveguide regions 220 and 244. The two slab waveguide regions 220 and 244 may be formed by deploying a single-folding technique described with reference to FIG. 5. The operation of system 204 and system 200 are similar except for generating the positive versus negative values of the dispersion D, respectively. The slab area 220 is coupled to receive N optical input/output ports 292 via bi-directional waveguides 296. The optical circulator 290 is included at each port to separate the input and output signals. Thus, while being operationally similar to the system 102 described with reference to FIG. 1C, the system 204 may be more compact (e.g., 2× reduction in slab and grating region sizes) and can be fabricated as a multi-port PGDD device on a small PLC chip. The optical circulator 290 may increase the footprint of the system 202. The multi-port PGDD functionality provided by the system 204 may be combined with nonlinear-optical material (e.g., in fiber or waveguide form) to fabricate an artificial nonlinear-optical group-delay-managed medium (NOGDMM) having customized dispersion properties that may be desired for multi-channel/multi-port operation. Additional details of the NOGDMM medium are described with reference to FIGS. 4A and 4B.

Referring back to FIG. 2C, the AAWG 190 is configured to include a grating of waveguides 232 disposed between the slab waveguide region 220 and the slab waveguide region 244. The second slab area 244 is configured to have border with the grating that is straight (e.g., non-curved). A pair of corner mirrors 262 arranged to form a right angle are disposed at a corner and along the periphery of the slab waveguide region 244. The mirrors 262 are configured to receive optical signals from the slab waveguide region 244 and reflect the signals back to the slab waveguide region 244 at the same angle, but along a different path.

The system 204 does not have a focal plane because of the straight boundary of the slab waveguide region 244 (focal plane at infinity). A value of the dispersion D for the system 204 is computed by using Equation 602 shown below.

$$D = 2\Delta^2 n_g^2 d/(c\lambda_o \alpha^2 n_s)$$ Eqn. 602

The systems 200 and 202 described with reference to FIGS. 2A and 2B, in addition to having the AAWG 190 with multiple input and output ports, includes a focal plane such that the different frequency components within each WDM channel pass through different spatial points in the focal plane. As described earlier, this plane where the spectra may 'almost entirely overlap' may be disposed in the middle of the slab, e.g., middle of the singular slab waveguide region 220 or slab waveguide region 244. In the focal plane, spectra of different WDM channels/input ports substantially overlap and the free spectral range of the AWG equals the WDM channel spacing.

Figure 2D:
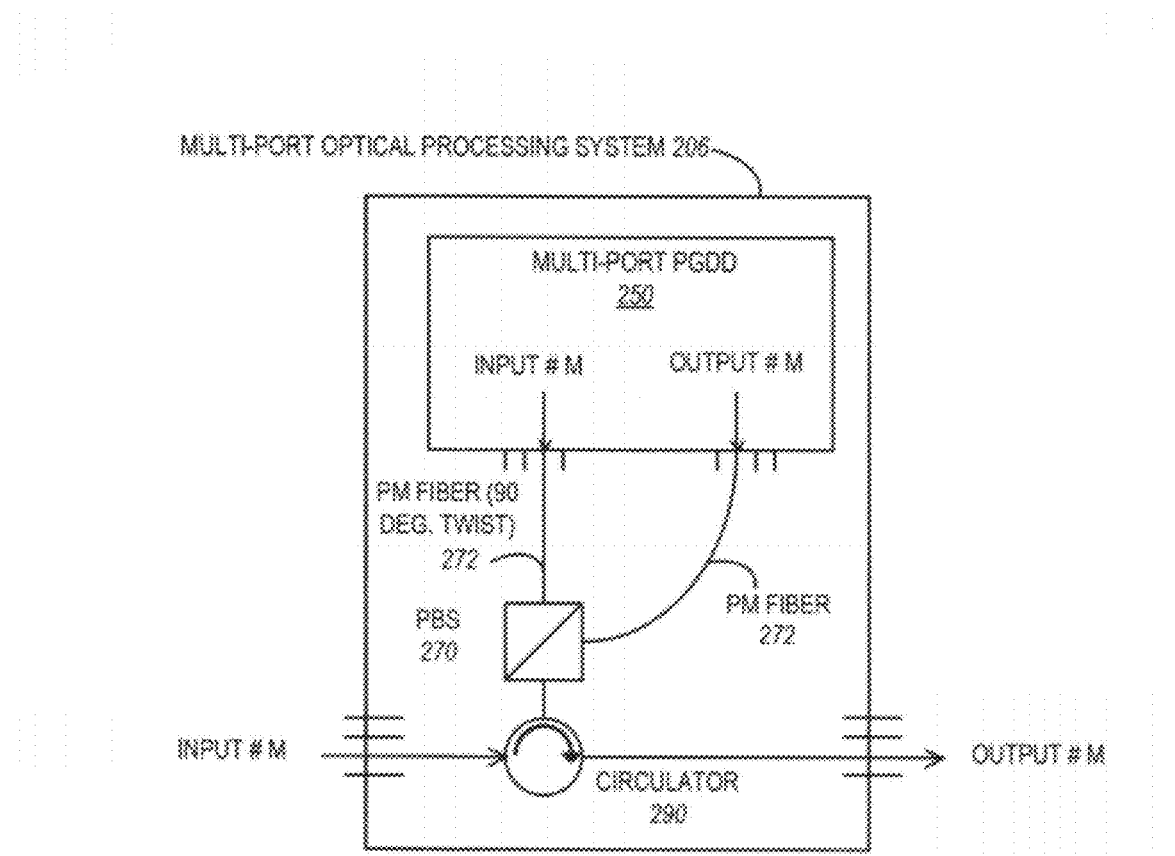
FIG. 2D illustrates an optical processing system to ensure polarization insensitivity of a multi-port PGDD, according to some embodiments.

FIG. 2D illustrates a multi-port optical processing system 206 to ensure polarization insensitivity of a multi-port PGDD 250, according to some embodiments. In some embodiments, the multi-port PGDD 250 may be implemented using the system 100, 102, and 104 described with reference to FIG. 1A, 1B, 1C, and 1D. Since many AWG devices may exhibit polarization-dependent loss, the optical processing system 206 may be configured to ensure polarization insensitivity of the multi-port PGDD 250.

The system 206 may include an optical circulator 290 and a polarization beam-splitter (PBS) 270 to ensure polarization insensitivity of the multi-port PGDD 250. Orthogonal polarizations of the input signal are separated by the polarization beam-splitter (PBS) 270, one of them is rotated by 90 degrees, and both are launched from the opposite ends into the PGDD via polarization-maintaining (PM) fiber 272. Due to the 90-degree rotation, the multi-port PGDD 250 processes only one polarization of the signal (but in two directions). The signals exiting the multi-port PGDD 250 may be recombined by the PBS 270 and separated from the input signal by the optical circulator 290. For an N-port PGDD, this scheme may be independently implemented on each of the N input-output port pairs.

Figures 3A, 3B:
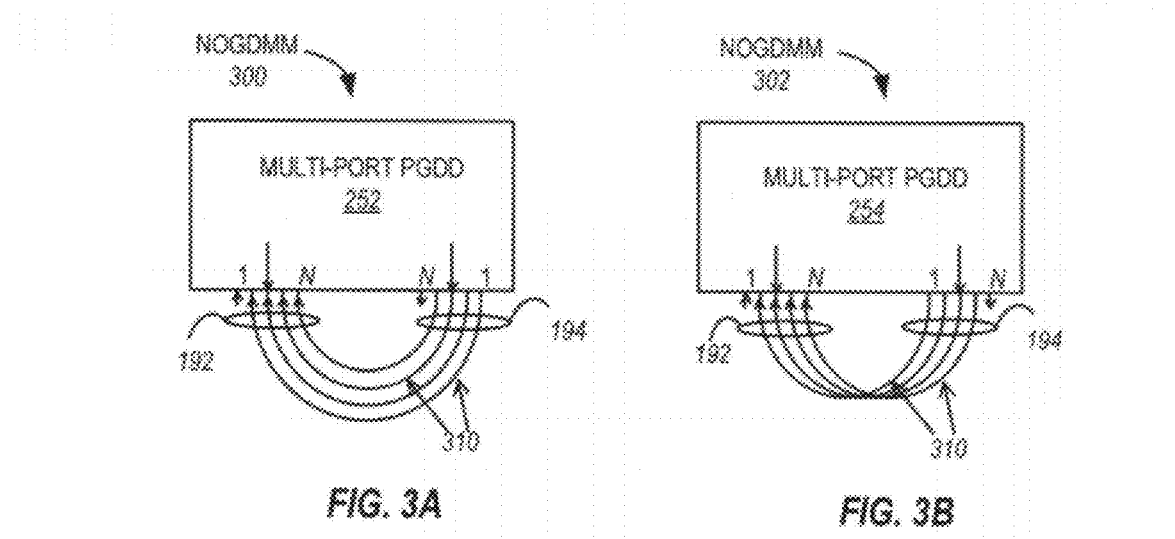
FIG. 3A illustrates an artificial nonlinear-optical group-delay-managed medium (NOGDMM) that is configured to avoid waveguide crossing, according to some embodiments.
FIG. 3B illustrates an artificial nonlinear-optical group-delay-managed medium (NOGDMM) that is configured with waveguide crossing, according to some embodiments.

FIG. 3A illustrates an artificial nonlinear-optical group-delay-managed medium (NOGDMM) 300 that is configured to avoid waveguide crossing, according to some embodiments. The NOGDMM 300 device includes a multi-port PGDD 252, e.g. that implemented using the system 100 described with reference to FIGS. 1A and 1B, and N sections of a nonlinear optical material 310 (e.g., fiber or waveguide), N being a positive integer number. The multi-port PGDD 252 includes N optical input ports 192 arranged in the order port #1 through port #N and the N optical output ports 194 arranged in the reverse order, e.g., port #N through port #1.

FIG. 3B illustrates an artificial nonlinear-optical group-delay-managed medium (NOGDMM) 302 that is configured with waveguide crossing, according to some embodiments. The NOGDMM 302 device includes a multi-port PGDD 254, e.g. that implemented using the system 102 and 104 described with reference to FIGS. 1C and 1D, and N sections of the nonlinear optical material 310 (e.g., fiber or waveguide), N being a positive integer number. The multi-port PGDD 254 includes N optical input ports 192 arranged in the order port #1 through port #N and the N optical output ports 194 arranged in the same order, e.g., port #1 through port #N.

Referring to FIGS. 3A and 3B, the multi-port PGDD 252 and 254 may optionally include enhancements to provide the polarization diversity described with reference to FIG. 2D. A Mth one of the N optical output ports 194 of the multi-port PGDD 252 and 254 is coupled to a (M+1)th one of the N optical input ports 192 by the Mth section of N sections of nonlinear optical material 310, M being a positive integer not greater than N−1. Input port #1 of the multi-port PGDD 252 and 254 is coupled to receive an input to the NOGDMM, and the output port #N of the multi-port PGDD 252 and 254 is coupled to send an output of the NOGDMM. The last Nth section of the nonlinear material either couples the input of the NOGDMM to the input port #1 of the PGDD, or couples the output port #N to the output of the NOGDMM.

Figure 4A:
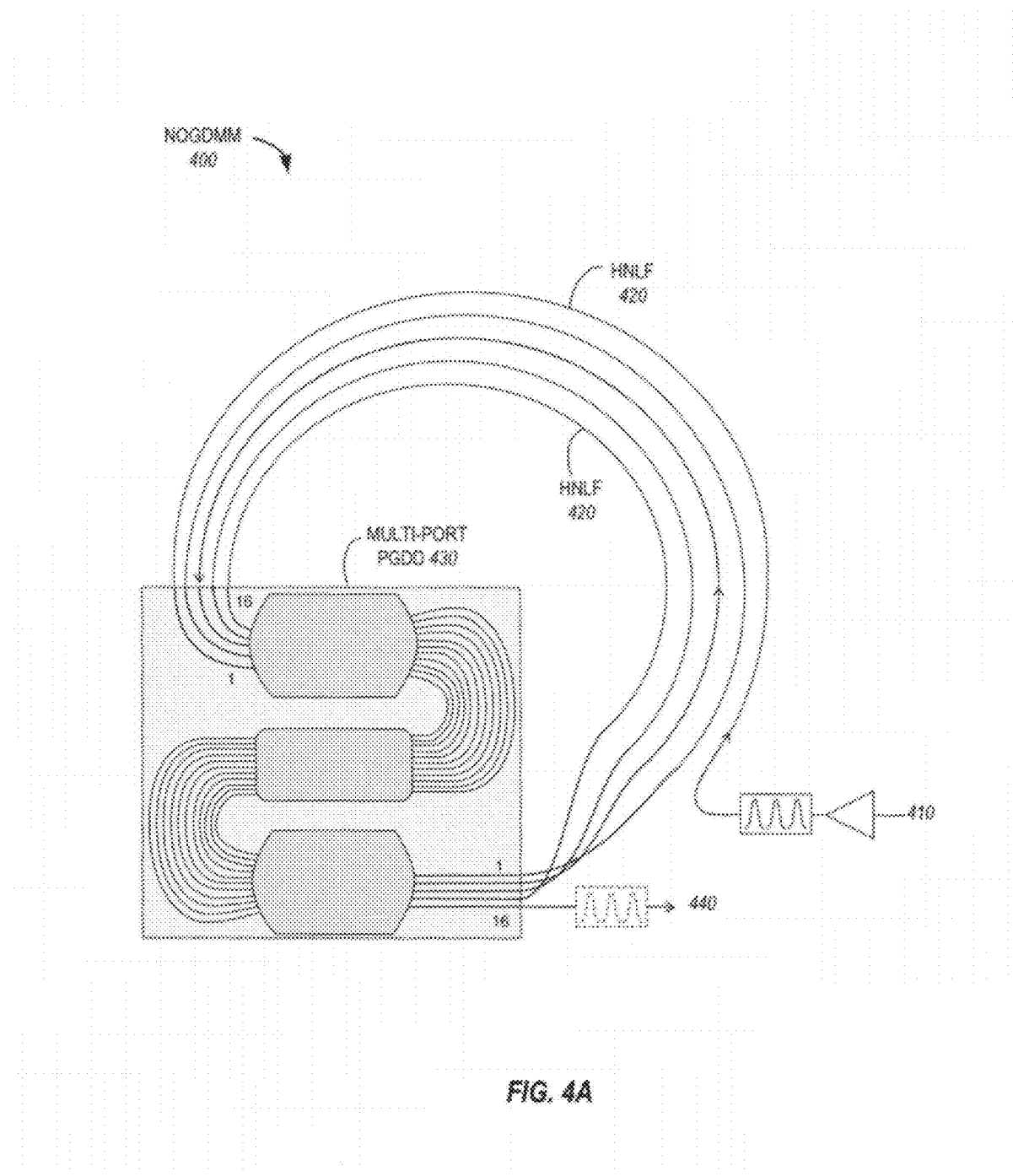
FIG. 4A illustrates all-optical regenerator based on an artificial nonlinear-optical group-delay-managed medium (NOGDMM) deploying a multi-port PGDD device described with reference to FIGS. 1C and 3B, according to some embodiments.

FIG. 4A illustrates an example of an all-optical regenerator based on an artificial nonlinear-optical group-delay-managed medium (NOGDMM) 400 deploying a multi-port PGDD device described with reference to FIG. 1C, according to some embodiments. A fiber optic input 410 is received, amplified, filtered (centered) from out-of-band noise and provided to N (N being configured to be equal to 16 in the depicted embodiment) sections of a highly-nonlinear fiber (HNLF) 420, one of which is coupled to the input port #1 of a multi-port PGDD 430 that is similar to the system 102 described with reference to FIG. 1C. It is understood that the multi-port PGDD device 430 may be configured to be similar to any multi-port PGDD devices 100, 102, 104, 200, 202, 204, 206, 252, and 254 described with reference to FIGS. 1A, 1B, 1C, 1D, 2A, 2B, 2C, 2D, 3A, and 3B. An Mth one of the N optical output ports 194 of the multi-port PGDD 430 is coupled to a (M+1)th one of the N optical input ports 192 by the Mth section of the HNLF 420, M being a positive integer not greater than N−1. The Nth output of the multi-port PGDD 430 is coupled to a bandpass filter (off-center) for generating the regenerated output 440. Each HNLF 420 may have a configurable length, e.g., 700 meters, and may be arranged as a circle having a diameter of about 20 centimeters.

Figure 4B:
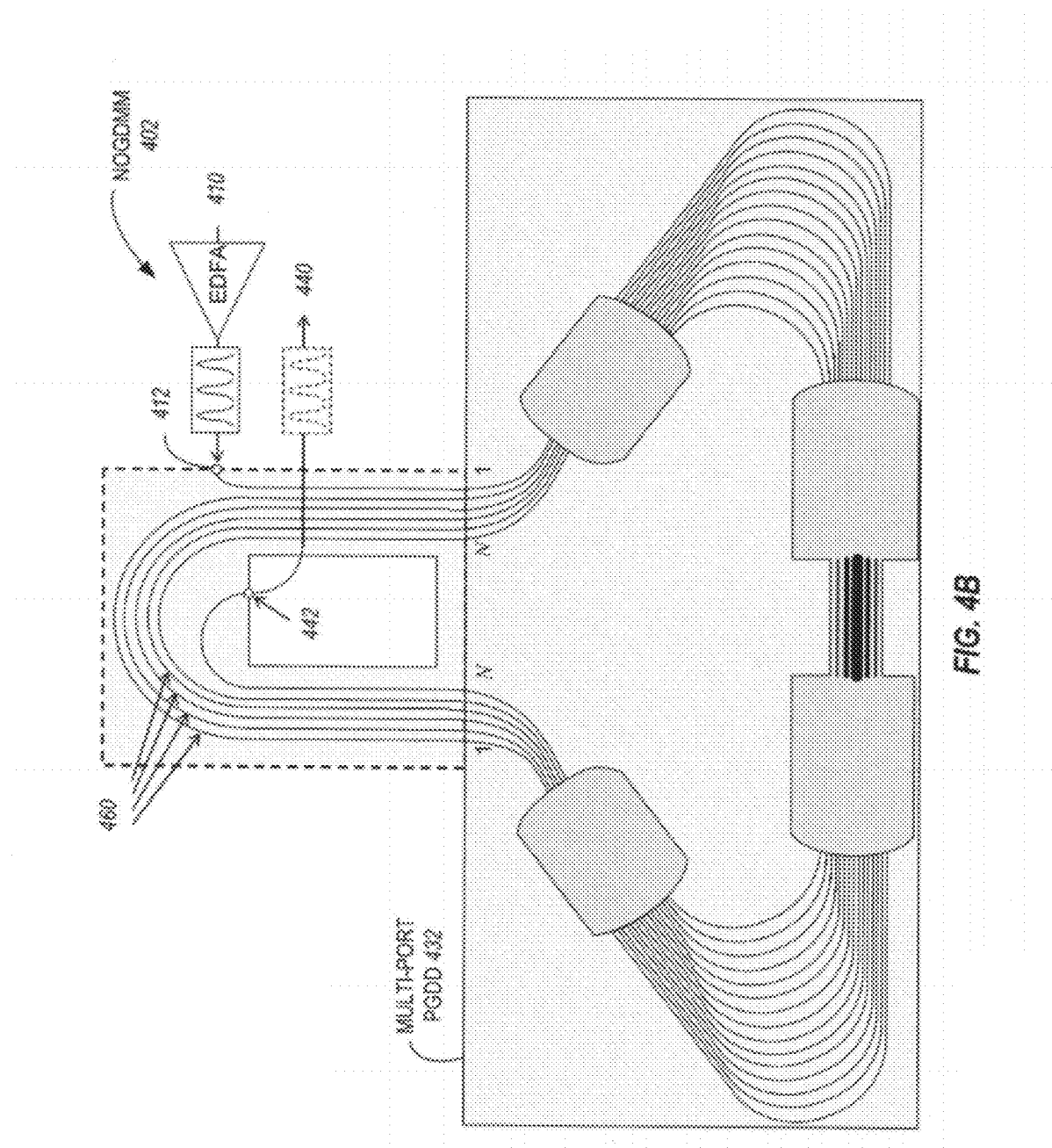
FIG. 4B illustrates all-optical regenerator based on an artificial nonlinear-optical group-delay-managed medium (NOGDMM) deploying a multi-port PGDD device described with reference to FIGS. 1A and 3A, according to some embodiments.

FIG. 4B illustrates an artificial nonlinear-optical group-delay-managed medium (NOGDMM) 402 deploying a multi-port PGDD device described with reference to FIGS. 1A and 1B, according to some embodiments. A fiber-optic input 410 is received, amplified, filtered, and provided via a fiber-to-waveguide coupler 412 to input port #1 of a multi-port PGDD 432 that is similar to the system 100 described with reference to FIGS. 1A and 1B. It is understood that the multi-port PGDD device 432 may be configured to be similar to any multi-port PGDD devices 100, 102, 104, 200, 202, 204, 206, 252, and 254 described with reference to FIGS. 1A, 1B, 1C, 1D, 2A, 2B, 2C, 2D, 3A, and 3B. An Mth one of the N optical output ports 194 of the multi-port PGDD 432 is coupled to a (M+1)th one of the N optical input ports 192 by N−1 ones of chalcogenide-glass waveguides 460, M being a positive integer not greater than N−1. The Nth output of the multi-port PGDD 432 is coupled via a waveguide-to-fiber coupler 442 to a bandpass filter (off-center) for generating a regenerated output 440. The entire NOGDMM 402 device may be implemented on a single PLC chip. It is desirable that the multi-port PGDD device 432 is configured to avoid waveguide crossing of the N ones of chalcogenide-glass waveguides 460 (as provided by system 100 described with reference to FIGS. 1A and 1B, for example).

Figure 6:
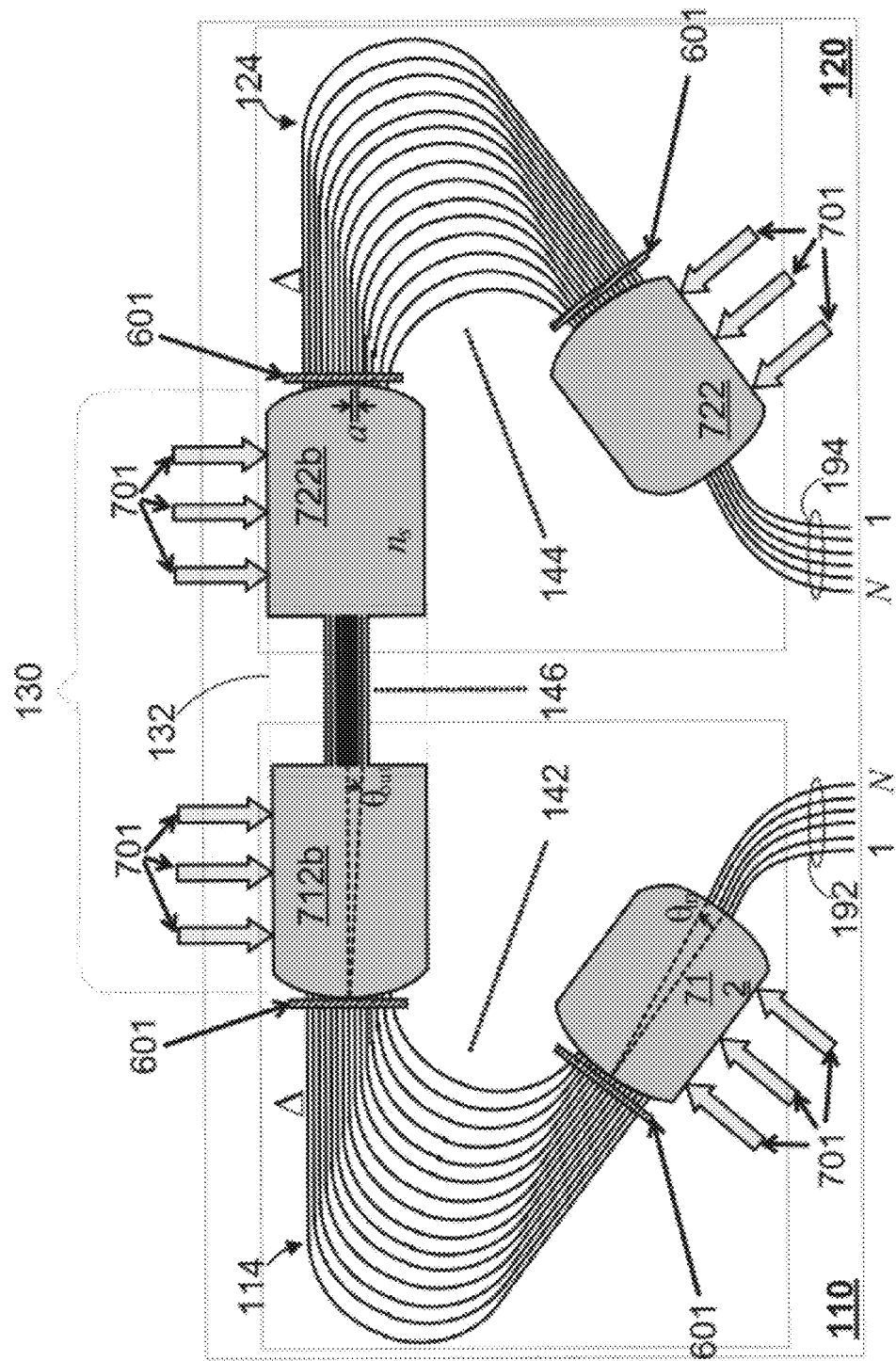
FIG. 6 illustrates the improved all-optical, multi-port optical processing system of FIG. 1A, but with the addition of birefringent waveplates, Er doping of the slab regions, and pumping of the Er doped slab regions by broad area laser diode beams, according to some embodiments.

While a PLC-platform-based PGDD may have a low loss, cascading many of these devices in a NOGDMM may lead to overall losses that may be approximately 10 dB, which might be higher than acceptable for some optical processing applications. The NOGDMM 402 which deploys the multi-port PGDD device on a PLC platform replaces multiple PGDDs by exciting different input ports of a single shared pair of arrayed-waveguide-gratings (AWGs) (e.g., using the AAWG 190), thereby resolving the loss, complexity, cost, and size issues. In addition, optical amplification in rare-earth-doped slab portion of the PLC may be used to compensate for the loss. For example, for Erbium-ion concentrations below the levels resulting in clustering and excitation quenching, a loss of about 0.5 to 0.75 dB per pass through a NOGDMM having a singular slab area. With 4 passes through the singular area of the multi-port PGDD, the loss of one PGDD-HNLF section may be easily compensated. The distributed (e.g., throughout the length of NOGDMM) application of gain may result in improved noise performance. In addition, pumping of the slab area may be performed from the side by means of broad-area laser diodes currently available in a variety of types and power ratings. FIG. 6 illustrates the improved all-optical, multi-port optical processing system of FIG. 1A, but with the addition, inter alia, of Er doping of the slab regions (hence renumbered as 712, 712b, 722, 722b) and broad area laser diode beams 701 for pumping the Er doped slab regions 712, 712b, 722, 722b, according to some embodiments. FIG. 7A illustrates the double-folded all-optical, multi-port optical processing system of FIG. 2A, but with the addition, inter alia, of Er doping of the slab region (hence renumbered as 720) and broad area laser diode beams 701 for pumping the Er doped slab region 720, according to some embodiments.

Figure 4C:
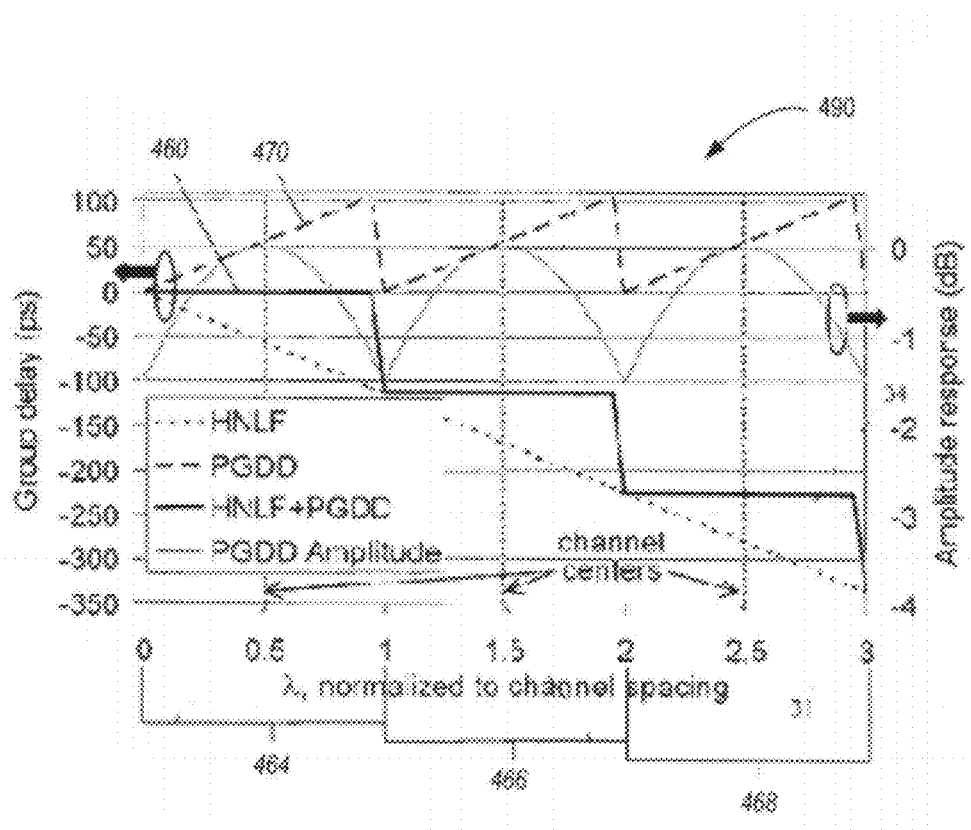
FIG. 4C illustrates in graphical form group delay spectrum of an artificial nonlinear-optical group-delay-managed medium (NOGDMM) comprised of a PGDD device coupled to HNLF, according to some embodiments.

FIG. 4C illustrates in graphical form group delay spectra 490 of an artificial nonlinear-optical group-delay-managed medium (NOGDMM) comprising of a PGDD coupled to HNLF, according to some embodiments. A group delay spectrum 460 (a staircase like graphical form) of the NOGDMM, e.g., NOGDMM described with reference to FIGS. 3A-3B and 4A-4B, maintains the dispersive walk-off among different spectral components of the same channel (e.g., one of channels 464, 466 or 468) low enough to provide sufficient SPM-induced spectral broadening while preserving integrity of the pulses, and strongly suppresses nonlinear inter-channel interactions (FWM and XPM) by means of high dispersion accumulated between any two of the channels 464, 466, and 468. A periodic group delay spectrum 470 is the primary feature of the multi-port PGDD device (e.g., PGDD 250, 252, 254 described with reference to FIGS. 2A, 2B, 2C, 2D, 3A, and 3B) that enables fast bit walk-off between the neighboring channels 464, 466 and 468. The PGDD group delay spectrum 470 is exactly periodic versus frequency and approximately periodic versus wavelength.

In a NOGDMM medium, different WDM channels propagate with different group velocities whereas various frequency components of the same channel travel at the same velocity. High phase- and group-velocity mismatch between the channels (inter-channel dispersion) dramatically suppresses FWM and XPM. At the same time, dispersion within each channel's band is kept small to preserve the pulse integrity for efficient spectral broadening by SPM, required for Mamyshev 2R regeneration scheme. Thus, the GDM medium having a dispersion map that is both spatially and spectrally periodic, eliminates nonlinear inter-channel interaction by ensuring large dispersive walk-off among different WDM channels, while preserving the integrity of the pulse within each channel. The staircase-like group-delay spectrum 460 of the nonlinear NOGDMM medium ensures that there is virtually no nonlinear interaction between the channels located on different steps of the staircase. That is, one can efficiently suppress the nonlinear interaction between the frequency bands corresponding to different steps of the group-delay-spectrum staircase. Thus, on each step of the staircase (which may be several-channels wide) one can perform an independent optical signal processing function.

Figure 5:
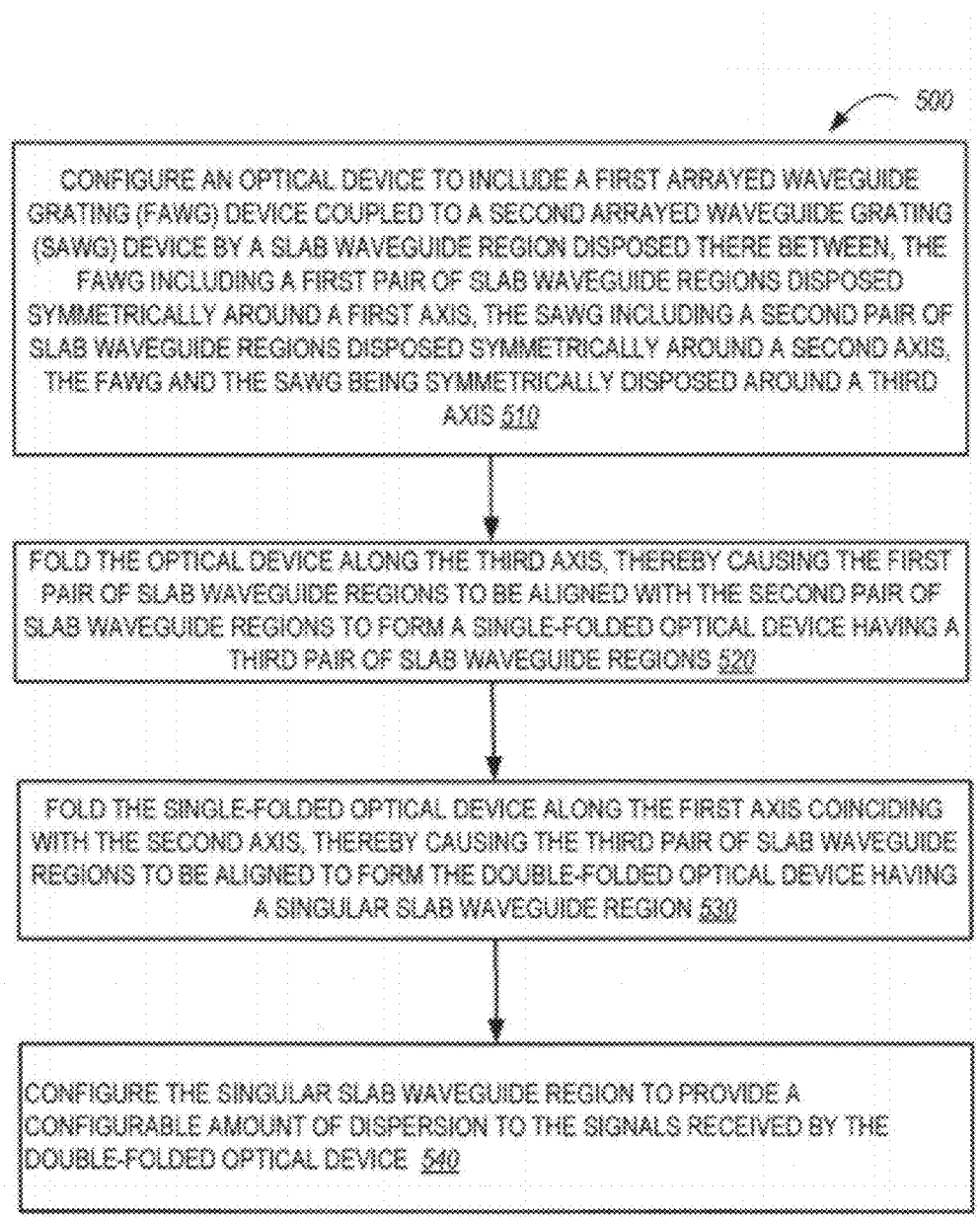
FIG. 5 illustrates a flowchart of a method for fabricating a double-folded optical device, according to some embodiments.

FIG. 5 illustrates a flowchart of a method 500 for fabricating a double-folded optical device, according to some embodiments. In a particular embodiment, the method 500 may be used for producing multi-port PGDD and NOGDMM devices described with reference to FIGS. 1A-1D, 2A-2D, 3A-3B, and 4A-4C. Referring to FIG. 5, at process 510, an optical device is configured to include a first arrayed waveguide grating (FAWG) device coupled to a second arrayed waveguide grating (SAWG) device by a slab waveguide region disposed there between, the FAWG including a first pair of slab waveguide regions disposed symmetrically around a first axis, the SAWG including a second pair of slab waveguide regions disposed symmetrically along a second axis, the FAWG and the SAWG being symmetrically disposed around a third axis. At process 520, the optical device is folded along the third axis, thereby causing the first pair of slab waveguide regions to be aligned with the second pair of slab waveguide regions to form a single-folded optical device having a third pair of slab waveguide regions. At process 530, the single-folded optical device is folded along the first axis coinciding with the second axis, thereby causing the third pair of slab waveguide regions to be aligned to form the double-folded optical device having a singular slab waveguide region. At process 540, the singular slab waveguide region is configured to provide a desirable amount of dispersion to the signals received by the double-folded optical device. This, for example, can be accomplished by adjusting the size of the singular slab waveguide and/or by introducing a parabolic phase shift (e.g. by means of thermal lens or curved mirror) on signals received by the double-folded optical device.

With reference to the method 500, it is understood, that various steps described above may be added, omitted, combined, altered, or performed in different order. For example, a single-folding technique for fabricating a single-folded optical device may be derived from method 500 by eliminating process 530 and modifying process 540 to configure a multi-port PGDD having two slab areas. A parabolic phase shifter may be added to one of the third pair of slab areas in the single-folded technique to impose a parabolic phase shift on signals. As another example, process 550 may be added after process 540 to configure the parabolic phase shifter by adding at least one mirror disposed along a periphery of the at least one slab waveguide region, wherein the at least one mirror is configured to impose a parabolic phase shift on the signals to introduce the dispersion, the amount of the dispersion being adjusted by configuring the curvature of one of the at least one mirror. Furthermore, the need for the optical circulators in single- and double-folded PGDD designs may be eliminated by employing a birefringent waveplate (e.g. half-wave plate or quarter-wave plate) disposed at the border of a slab waveguide region and the optical grating. When combined with the optical grating waveguides exhibiting significant birefringence under stress, this may effectively introduce different length increments for the signals propagating in forward and backward directions along the grating waveguides. As a result, the input and output ports may become spatially separated. In this regard, FIG. 6 illustrates the potential locations of optional birefringent waveplates 601, in accordance with one or more embodiments of the present invention. FIG. 7A illustrates the double-folded all-optical, multi-port optical processing system of FIG. 2A, but with the addition, inter alia, of a birefringent waveplate 601, according to some embodiments. FIG. 7B is an inset (partial or fragmentary view) comprising a side view of a cross-section of the waveguide grating with the birefringent waveplate 601 of FIG. 7A, according to some embodiments. (It is noted that the various elements in FIGS. 6, 7A and 7B are not necessarily drawn to scale. In addition, the scale of the same elements may vary across FIGS. 6, 7A and 7B.)

Several advantages are achieved by the method and system according to the illustrative embodiments presented herein. The embodiments advantageously provide an improved multi-port optical device that may be orders of magnitude reduced in cost, size, and power consumption. The improved optical device is potentially compatible with mobile and solar-powered operation and is compatible with mass production in silicon foundry. The improved optical device has considerably lower loss compared to existing bulk- or integrated-optics solutions. Complexity is reduced by several orders of magnitude leading to dramatically increased reliability (that may be particularly important for military and undersea communications). The improved optical device may be configured to provide a variety of signal-processing functions beyond PGDD, e.g. fixed or tunable periodic amplitude and phase responses, optical amplification, and others. Bit-rate flexibility is improved since the same device may handle multiple bit rates. The improved optical device may be a potential enabler of all-optical burst- and packet-switched networking, which may dramatically simplify network management and reduce subsequent end-user costs.

The improved optical processing system may be used in fiber-based, as well as in free-space optical communications. Potential applications of the compact optical device may include: 1) Extending range and capacity of board-to-board interconnects in computer networks; 2) Long-haul and ultra-long-haul communications: e.g., one device per fiber per approximately 200 km; 3) Metropolitan-area networks: e.g., one regenerator per ingress/egress port per node; 4) Satellite optical networks: e.g., one regenerator per input port per satellite; 5) Scalable and survivable war-theater networks: e.g., one regenerator per unmanned aerial vehicle (UAV), piloted aircraft, small ship, tank or armored vehicle; 6) Extending secure line-of sight communications in ground combat; and many others.

Although illustrative embodiments have been shown and described, a wide range of modification, change and substitution is contemplated in the foregoing disclosure and in some instances, some features of the embodiments may be employed without a corresponding use of other features. Those of ordinary skill in the art will appreciate that the hardware and methods illustrated herein may vary depending on the implementation. For example, while certain aspects of the present disclosure have been described in the context of a PGDD, the improved optical device may be configured to provide a variety of signal-processing functions beyond PGDD, e.g. fixed or tunable periodic amplitude and phase responses, optical amplification, and others.

The methods and systems described herein provide for an adaptable implementation. Although certain embodiments have been described using specific examples, it will be apparent to those skilled in the art that the invention is not limited to these few examples. The benefits, advantages, solutions to problems, and any element(s) that may cause any benefit, advantage, or solution to occur or become more pronounced are not to be construed as a critical, required, or an essential feature or element of the present disclosure.

The above disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An apparatus comprising:
   a periodic group-delay device (PGDD) having an adapted arrayed waveguide grating (AAWG) device comprising:
   N optical input ports, N being a positive integer number greater than one, each input port being configured to include at least one wavelength-division-multiplexing (WDM) channel, at least one of the N input ports being configured to include two or more WDM channels;
   N corresponding optical output ports, each output port being configured to include one or more WDM channels;
   a first slab waveguide region (FSWR) coupled to the N optical input ports;
   a second slab waveguide region (SSWR) coupled to the N optical output ports;
   a first optical grating coupled to the FSWR;
   a second optical grating coupled to the SSWR; and
   a third slab waveguide region (TSWR) coupled to at least one of the first and second optical gratings, wherein the TSWR is configured to provide a configurable amount of dispersion to the N optical output ports;

wherein a free spectral range of at least one of the first and second optical gratings is substantially equal to a frequency spacing between the WDM channels; and wherein the FSWR and the SSWR are configured for processing signals from each of the N optical input ports independently of and concurrently with each other and routing the signals from each of the N optical input ports through different output ports.

2. The apparatus of claim 1, wherein at least one of the FSWR, the SSWR, and the TSWR is configured to generate a focal plane, wherein different frequencies within each WDM channel pass through different spatial points in the focal plane.

3. The apparatus of claim 2, wherein WDM spectra from different input ports of the N optical input ports substantially overlap in a focal plane.

4. The apparatus of claim 1, wherein the FSWR and the SSWR are aligned for folding along a symmetrical axis.

5. The apparatus of claim 1, wherein the first and the second optical grating are aligned for folding along a symmetrical axis.

6. The apparatus of claim 1, wherein the FSWR, the SSWR and the TSWR are aligned for folding along a symmetrical axis.

7. The PGDD of claim 1, wherein an Mth port of the N input ports and a corresponding Mth port of the N output ports are optically coupled to the FSWR by one of a bi-directional optical waveguide and an optical fiber, and an optical circulator is used to separate the Mth input from the Mth output, M being positive integer number not greater than N.

8. The apparatus of claim 1, further comprising one or more lenses disposed within the TSWR, the one or more lenses being configured to be fixed or tunable.

9. The apparatus of claim 8, wherein the one or more lenses is a thermo-optic lens.

10. The apparatus of claim 8, wherein the one or more lenses is disposed in a focal plane in the TSWR, such that different frequencies within each WDM channel pass through different spatial points in the focal plane.

11. The PGDD of claim 1 further comprising at least one mirror disposed along a periphery of at least one slab waveguide region, the at least one mirror being configured to be flat or curved.

12. The PGDD of claim 11, wherein the at least one mirror is disposed in a focal plane in the at least one slab waveguide region, such that different frequencies within each WDM channel pass through different spatial points in the focal plane.

13. The apparatus of claim 1,
wherein different ones of the WDM channels carried by an Mth input port of the N optical input ports are delayed in time and provided to the corresponding Mth output port of the N optical output ports, M being a positive integer number not greater than N,
wherein center frequencies of the different ones of the WDM channels carried by the Mth input port of the N optical input ports to the corresponding Mth output port of the N optical output ports are delayed in time by substantially the same amount of group delay,
wherein the amount of group delay between two frequency components within each of the WDM channels carried by the Mth input port of the N optical input ports to the corresponding Mth output port of the N optical output ports is proportional to a difference between two frequencies of the two frequency components, with a proportionality constant being substantially the same for the different ones of the WDM channels.

14. The apparatus of claim 1, wherein an optical signal carried by one of the WDM channels of the N optical input ports is processed concurrently and independently of the other signals carried by another WDM channel or another of the N optical input ports.

15. The apparatus of claim 1, wherein a boundary between a slab waveguide region and an optical grating is substantially flat, the slab waveguide region being selectable to be one of the FSWR, the SSWR and the TSWR, and the optical grating being selectable to be one of the first optical grating and the second optical grating, thereby moving a focal plane outside of the slab waveguide region.

16. The apparatus of claim 1, wherein spectrally periodic group delays are concurrently and independently added to signals carried by the N optical input ports to provide the signals at the N optical output ports.

17. The PGDD of claim 1, further comprising at least 4 optical arrayed waveguide gratings arranged in two cascaded reverse-S shapes to control an amplitude response of signals at the N optical output ports.

18. The apparatus of claim 1, further configured to impose spectrally periodic amplitude and phase response onto each signal carried by the N optical output ports.

19. The apparatus of claim 1, wherein the configurable amount of dispersion provided to the N optical output ports is negative, the dispersion being measurable in picoseconds per nanometer.

20. The apparatus of claim 1, wherein the configurable amount of dispersion provided to the N optical output ports is positive, the dispersion being measurable in picoseconds per nanometer.

21. The apparatus of claim 1, wherein the PGDD is fabricated on a planar lightwave circuit (PLC) chip.

22. The PGDD of claim 1, further configured in a single-folded shape, wherein a mirror coupled to the TSWR is used to fold the SSWR onto the FSWR.

23. The PGDD of claim 1, further configured in a double-folded shape, wherein a first mirror is used to fold the second slab waveguide region onto the first slab waveguide region and the second optical mirror is used to fold the third slab waveguide region onto the first slab waveguide region.

24. The PGDD of claim 1, wherein a birefringent waveplate is inserted at the boundary between at least one optical grating and at least one slab waveguide region, the at least one slab waveguide region being selectable to be one of the FSWR, the SSWR and the TSWR, the at least one optical grating being selectable to be one of the first optical grating and the second optical grating.

25. The apparatus of claim 1, wherein one or more of the FSWR, the SSWR and the TSWR is doped with an active material, and wherein an optical pump is coupled to the doped one or more of the FSWR, the SSWR and the TSWR to provide optical gain for signals received at the N optical input ports.

26. The apparatus of claim 1, wherein, in the TSWR, a shift between WDM spectra from different ones of the N input ports is smaller than the spacing between the WDM channels.

27. The apparatus of claim 1, wherein, in the TSWR, WDM spectra of an $m^{th}$ diffraction order from one input port of the N input ports overlap with WDM spectra of an $(m+1)^{th}$ diffraction order from one of the input ports adjacent to the one input port.

28. The apparatus of claim 1, wherein an Mth input port of the N optical input ports is coupled to an Mth output port of the N optical output ports, with an input-output transfer function having a periodic group-delay response.

29. The apparatus of claim 1, wherein, in the TSWR, WDM spectra of adjacent input ports are shifted from each other and generate a sliding-frequency filter, with a periodic group-delay and an amplitude response configured to filter the WDM channels.

30. The apparatus of claim 1, further comprising:
a parabolic phase shifter (PPS) added to at least one of the FSWR, the SSWR and the TSWR to impose a parabolic phase shift on frequencies within each WDM channel.

31. A nonlinear-optical group-delay-managed medium (NOGDMM) comprising:
an NOGDMM optical input port configured to include at least two wavelength-division-multiplexing (WDM) channels;
an NOGDMM optical output port;
N sections of a nonlinear-optical material, N being a positive integer number greater than one; and
a multi-port periodic group-delay device (PGDD) comprising at least one slab waveguide region coupled to receive N optical input ports and provide corresponding N optical output ports, wherein each of the N optical input ports is configured to carry at least one signal having at least one WDM channel;
wherein, for every value of M, where M is a positive integer number ranging from one to N−1 inclusively, an Mth output port of the N optical output ports is coupled to an (M+1)th input port of the N optical input ports by an Mth section of the N sections of the nonlinear optical material, such that the Mth section of the nonlinear optical material is coupled to the PGDD, whereby N−1 sections of the nonlinear optical material are coupled to the PGDD;
wherein the Nth optical output port of the N optical output ports is coupled to the NOGDMM optical output port by the Nth section of the N sections of the nonlinear optical material, such that the Nth section of the nonlinear optical material is coupled to the PGDD, whereby an additional one section of the nonlinear optical material is coupled to the PGDD;
wherein spectrally periodic group delays are concurrently and independently added to the signals carried by the N optical input ports, the signals being subsequently coupled to the corresponding N optical output ports;
wherein the PGDD and at least one of the N sections of the nonlinear optical material coupled thereto are configured to create a dispersion, the dispersion reducing nonlinear interaction among the WDM channels;
wherein the WDM channels are spaced in frequency by one or more free spectral range of the PGDD; and
wherein the NOGDMM optical output port is configured to receive the signals from the Nth optical output port of the N optical output ports of the multi-port PGDD.

32. The NOGDMM of claim 31, wherein the N sections of the nonlinear optical material and the multi-port PGDD are fabricated on a planar lightwave circuit (PLC) chip.

33. The NOGDMM of claim 31, wherein the N sections of the nonlinear optical material are chalcogenide glass waveguides.

34. The NOGDMM of claim 31, wherein the multi-port PGDD is configured to include at least two arrayed waveguide gratings configured in a reverse-S shaped arrangement.

35. The NOGDMM of claim 31, wherein an order of the N optical output ports of the multi-port PGDD is reversed relative to the order of the N optical input ports.

36. The NOGDMM of claim 31, further comprising one or more optical gratings, wherein a free spectral range of at least one of the one or more optical gratings is substantially equal to a frequency spacing between the WDM channels.

37. The NOGDMM of claim 31, wherein a group delay is accumulated between center frequencies of a pair of adjacent WDM channels, and an absolute value of the group delay accumulated between the center frequencies of the pair of adjacent WDM channels normalized by a frequency spacing between the pair of adjacent WDM channels is at least substantially four times greater than an absolute value of a group delay accumulated between any two frequency components of either one of the pair of adjacent WDM channels normalized by a frequency spacing between the two frequency components.

38. The NOGDMM of claim 31, wherein the PGDD and the N sections of the nonlinear optical material coupled thereto are configured to create a dispersion, the dispersion reducing nonlinear interaction among the WDM channels.

39. The NOGDMM of claim 31, wherein the PGDD and at least one of the N sections of the nonlinear-optical material coupled thereto are configured to create a staircase-like group delay spectrum, the staircase-like group delay spectrum reducing nonlinear interaction among the WDM channels.

40. A method for fabricating a single-folded, multi-port periodic group-delay device (PGDD), the method comprising:
configuring a periodic group-delay device (PGDD) providing a periodic group-delay response to include:
N optical input ports, N being a positive integer number greater than one, each input port being configured to include at least one wavelength-division-multiplexing (WDM) channel and at least one input port configured to include at least two WDM channels,
N optical output ports, and
a first arrayed waveguide grating (FAWG) device coupled to a second arrayed waveguide grating (SAWG) device by a slab waveguide region disposed therebetween, the FAWG including a first pair of slab waveguide regions disposed symmetrically around a first axis, the SAWG including a second pair of slab waveguide regions disposed symmetrically around a second axis, the FAWG and the SAWG being symmetrically disposed around a third axis;
the PGDD being further configured to have a free spectral range of at least one of the FAWG and the SAWG substantially equal to a frequency spacing between the WDM channels; and
folding the configured PGDD along the third axis, thereby causing the first pair of slab waveguide regions to be aligned with the second pair of slab waveguide regions to form a single-folded PGDD having a third pair of slab waveguide regions.

41. A nonlinear-optical group-delay-managed medium (NOGDMM) comprising:
an NOGDMM optical input port configured to include at least two wavelength-division-multiplexing (WDM) channels;
an NOGDMM optical output port;
N sections of a nonlinear-optical material, N being a positive integer number greater than one; and
a multi-port periodic group-delay device (PGDD) comprising at least one slab waveguide region coupled to receive N optical input ports and provide corresponding N optical output ports, wherein each of the N optical input ports is configured to carry at least one signal having at least one WDM channel;
wherein, for every value of M, where M is a positive integer number ranging from one to N−1 inclusively, an Mth output port of the N optical output ports is coupled to an (M+1)th input port of the N optical input ports by an Mth section of the N sections of the nonlinear optical material, such that the Mth section of the nonlinear optical material is coupled to the PGDD, whereby N−1 sections of the nonlinear optical material are coupled to the PGDD;

wherein the first input port of the N optical input ports is coupled to the NOGDMM optical input port by the Nth section of the N sections of the nonlinear optical material, such that the Nth section of the nonlinear optical material is coupled to the PGDD, whereby an additional one section of the nonlinear optical material is coupled to the PGDD;

wherein spectrally periodic group delays are concurrently and independently added to the signals carried by the N optical input ports, the signals being subsequently coupled to the corresponding N optical output ports;

wherein the PGDD and at least one of the N sections of the nonlinear optical material coupled thereto are configured to create a dispersion, the dispersion reducing nonlinear interaction among the WDM channels;

wherein the WDM channels are spaced in frequency by one or more free spectral range of the PGDD; and wherein the NOGDMM optical output port is configured to receive the signals from the Nth output port of the N optical output ports of the multi-port PGDD.

42. The NOGDMM of claim 41, wherein the PGDD and the N sections of the nonlinear optical material coupled thereto are configured to create a dispersion, the dispersion reducing nonlinear interaction among the WDM channels.

43. The NOGDMM of claim 41, wherein the PGDD and at least one of the N sections of the nonlinear-optical material coupled thereto are configured to create a staircase-like group delay spectrum, the staircase-like group delay spectrum reducing nonlinear interaction among the WDM channels.

* * * * *